United States Patent
Laskaridis et al.

(10) Patent No.: US 12,450,489 B2
(45) Date of Patent: Oct. 21, 2025

(54) METHOD, SYSTEM AND APPARATUS FOR FEDERATED LEARNING

(71) Applicant: Samsung Electronics Co., Ltd., Suwon-si (KR)

(72) Inventors: Stefanos Laskaridis, Middlesex (GB); Samuel Horvath, Middlesex (GB); Mario Almeida, Middlesex (GB); Ilias Leontiadis, Middlesex (GB); Stylianos I. Venieris, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 842 days.

(21) Appl. No.: 17/586,178

(22) Filed: Jan. 27, 2022

(65) Prior Publication Data

US 2022/0245459 A1    Aug. 4, 2022

Related U.S. Application Data

(63) Continuation of application No. PCT/KR2022/000938, filed on Jan. 18, 2022.

(30) Foreign Application Priority Data

Feb. 2, 2021   (GR) .............................. 20210100067
Sep. 6, 2021   (EP) ..................................... 21195060

(51) Int. Cl.
    *G06N 3/082*      (2023.01)
    *G06N 3/045*      (2023.01)

(52) U.S. Cl.
    CPC ............. *G06N 3/082* (2013.01); *G06N 3/045* (2023.01)

(58) Field of Classification Search
    CPC ........ G06N 3/082; G06N 3/045; G06N 3/044; G06N 3/084
See application file for complete search history.

(56) References Cited

U.S. PATENT DOCUMENTS 10,657,461 B2    5/2020    McMahan et al.
2015/0100530 A1*   4/2015   Mnih ....................... G06N 3/08
                                                     706/25

(Continued)

FOREIGN PATENT DOCUMENTS

CN     107871160 A    4/2018
CN     111865815 A    10/2020

(Continued)

OTHER PUBLICATIONS

Pavlo Molchanov, Stephen Tyree, Tero Karras, Timo Aila, Jan Kautz. "Pruning Convolutional Neural Networks for Resource Efficient Inference". arXiv:1611.06440. (Year: 2017).*

(Continued)

*Primary Examiner* — Abdullah Al Kawsar
*Assistant Examiner* — Gisel Gabriela Faccenda
(74) *Attorney, Agent, or Firm* — Jefferson IP Law, LLP

(57) ABSTRACT

Broadly speaking, the present techniques generally relates to methods, systems and apparatuses for training a machine learning (ML) model using federated learning. In particular, a method for training a machine learning (ML) model using federated learning performed by a plurality of client devices, the method comprising determining a computation capability of each client device, associating each client device with a value defining how much of each neural network layer of the ML model is to be included in a submodel to be trained by the each client device, based on the determined computation capability and generating a submodel of the ML model by using the value associated with the each client device to perform ordered pruning of at least one neural network layer of the ML model, is provided.

19 Claims, 22 Drawing Sheets

(56) References Cited

U.S. PATENT DOCUMENTS

| | | | |
|---|---|---|---|
| 2017/0076198 A1 | 3/2017 | Jin et al. | |
| 2018/0349769 A1 | 12/2018 | Mankovskii et al. | |
| 2020/0245009 A1 | 7/2020 | Saini et al. | |
| 2020/0364608 A1 | 11/2020 | Anwar et al. | |

FOREIGN PATENT DOCUMENTS

| | | | |
|---|---|---|---|
| KR | 10-2020-0133484 | | 11/2020 |
| WO | WO-2022028666 A1 * | 2/2022 | ............. G06N 3/063 |
| WO | 2020/222407 A1 | 11/2022 | |

OTHER PUBLICATIONS

Song Han, Jeff Pool, John Tran, William J. Dally. "Learning both Weights and Connections for Efficient Neural Networks". arXiv: 1506.02626. (Year: 2015).*
Duchi et al., Privacy Aware Learning, Advances in Neural Information Processing Systems 25_2012.
Alistarh et al., QSGD: Communication-efficient SGD via gradient quantization and encoding. Advances in Neural Information Processing Systems 2017.
Wen et al., TernGrad: Ternary gradients to reduce communication in distributed deep learning. Advances in Neural Information Processing Systems, Dec. 29, 2017.
Jiang et al., Model Pruning Enables Efficient Federated Learning on Edge Devices, Oct. 23, 2020.
Caldas et al., Expanding the Reach of Federated Learning by Reducing Client Resource Requirements, Jan. 8, 2019.
Srivastava et al., Dropout: A Simple Way to Prevent Neural Networks from Overfitting. Journal of Machine Learning Research, 15(56): Journal of Machine Learning Research 15 (2014) 1929-1958.
Mcmahan et al., Communication-efficient learning of deep networks from decentralized data. In Artificial Intelligence and Statistics, Feb. 28, 2017.
Li et al., Federated Optimization in Heterogeneous Networks. MLSys, Apr. 21, 2020.
Wang et al., Tackling the Objective Inconsistency Problem in Heterogeneous Federated Optimization. NeurIPS, 2020.
Karimireddy et al., SCAFFOLD: Stochastic Controlled Averaging for Federated Learning. International Conference on Machine Learning, Apr. 9, 2021.
Abadi et al., Deep Learning with Differential Privacy, Oct. 24, 2016.
Zagoruyko et al., Paying More Attention to Attention: Improving the Performance of Convolutional Neural Networks via Attention Transfer. CoRR, Dec. 12, 2016.
Wang et al., Adaptive Federated Learning in Resource Constrained Edge Computing Systems, Feb. 17, 2019.
Konecny et al., Federated Learning: Strategies for Improving Communication Efficiency. pp. 1.10, Oct. 30, 2017.
Wang et al., ATOMO: Communication-efficient learning via atomic sparsification. Advances in Neural Information Processing Systems, Nov. 8, 2018.
Amiri et al., Federated Learning With Quantized Global Model Updates, Oct. 7, 2020.
Han et al., Adaptive Gradient Sparsification for Efficient Federated Learning: An Online Learning Approach. ICDCS, Mar. 20, 2020.
Smith et al., Federated multi-task learning. In Advances in neural information processing systems, 2017.
Han et al., Deep Compression: Compressing Deep Neural Network with Pruning, Trained Quantization and Huffman Coding. ICLR, Feb. 15, 2016.
Zhou et al., DoReFa-Net: Training Low Bitwidth Convolutional Neural Networks with Low Bitwidth Gradients, Feb. 2, 2018.
Rajagopal et al., Multi-Precision Policy Enforced Training (MuPPET): A Precision-Switching Strategy for Quantised Fixed-Point Training of CNNs, Jun. 16, 2020.
Luo et al., Thinet: A filter level pruning method for deep neural network compression. In Proceedings of the IEEE International conference on computer vision, Jul. 20, 2017.
Yu et al., Scalpel: Customizing DNN pruning to the underlying hardware parallelism. ACM SIGARCH Computer Architecture News, 2017.
Wang et al., Beyond filters: Compact feature map for portable deep model. In International Conference on Machine Learning, 2017.
Molchanov et al., Importance estimation for neural network pruning. In Proceedings of the IEEE Conference on Computer Vision and Pattern Recognition, Jun. 25, 2019.
Rippel et al., Learning ordered representations with nested dropout. 31st International Conference on Machine Learning. 2014.
Howard et al., MobileNets: Efficient Convolutional Neural Networks for Mobile Vision Applications. arXiv, Apr. 17, 2017.
Sandler et al., MobileNetV2: Inverted Residuals and Linear Bottlenecks. In Proceedings of the IEEE Conference on Computer Vision and Pattern Recognition, Apr. 2, 2018.
Zhang et al., ShuffleNet: An Extremely Efficient Convolutional Neural Network for Mobile Devices. In Proceedings of the IEEE Conference on Computer Vision and Pattern Recognition, Dec. 7, 2017.
Hinton et al., Distilling the Knowledge in a Neural Network. In NIPS 2014 Deep Learning Workshop, Mar. 9, 2015.
Diao et al., XP 055890230 (Computation and Communication Efficient Federated Learning for Heteroge Neous Clients), Oct. 3, 2020.
Bouacida et al., XP 081808992 (Adaptive Federated Dropout Improving Communication Efficiency and Generalization for Federated Learning), Nov. 8, 2020.
European Search Report dated Mar. 1, 2022, issued in European Patent Application No. 21195060.5.
International Search Report with Written Opinion dated May 2, 2022, issued in International Patent Application No. PCT/KR2022/000938.
European Communication pursuant to Article 94(3) EPC dated May 19, 2025; European Appln. No. 21 195 060.5-1207.
Chinese Office Action with English translation dated Jul. 1, 2025; Chinese Appln. No. 202280013009.9.

* cited by examiner

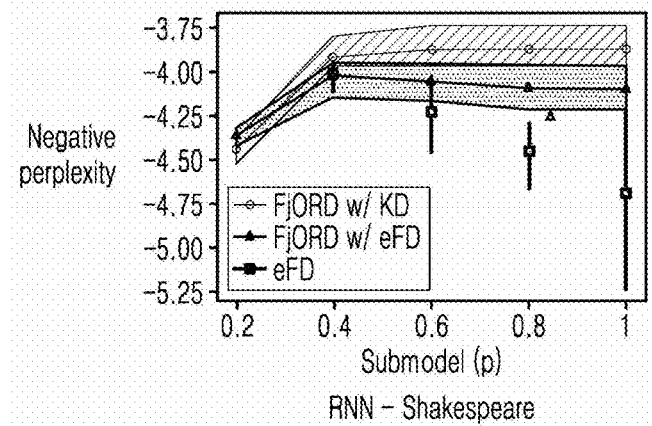

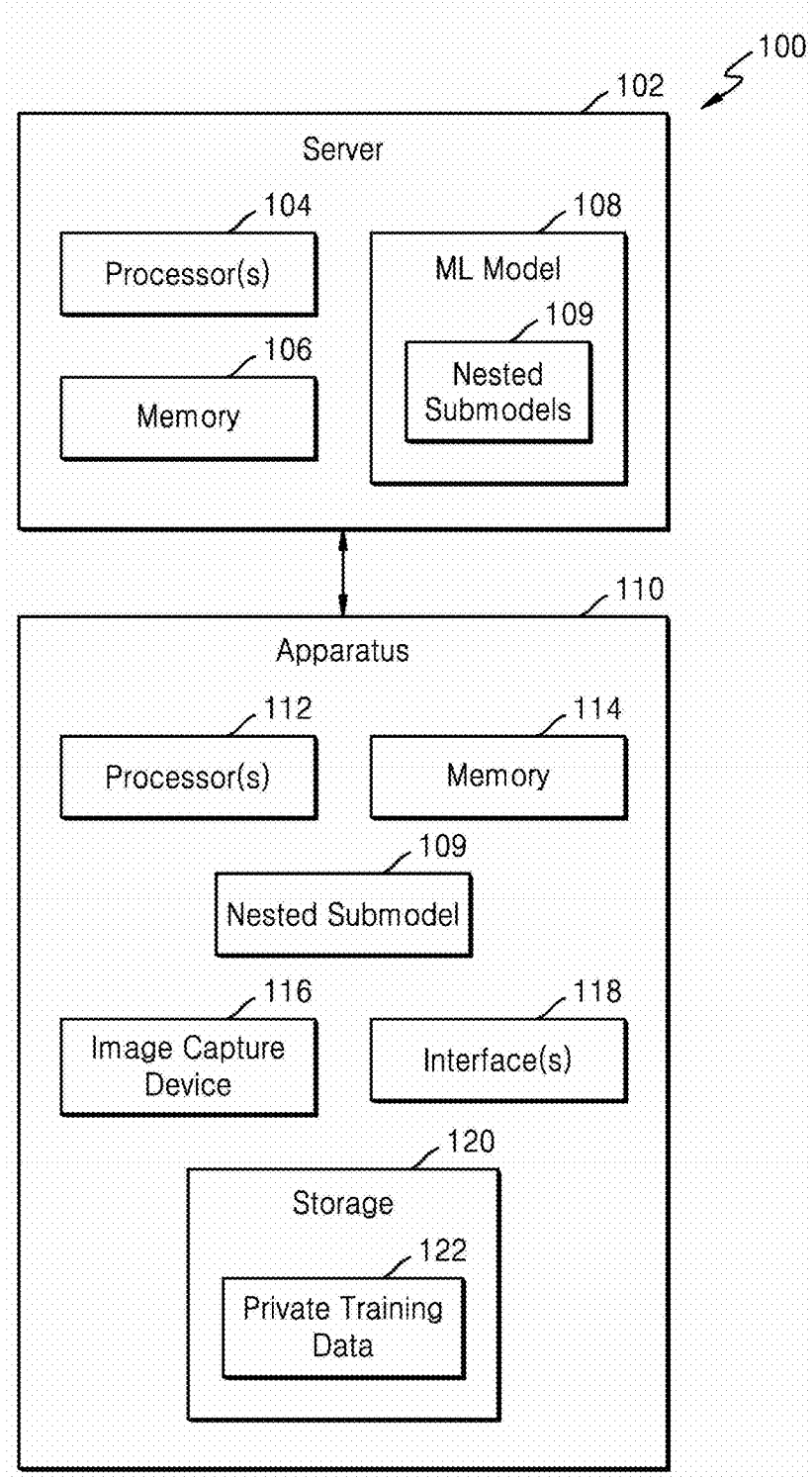

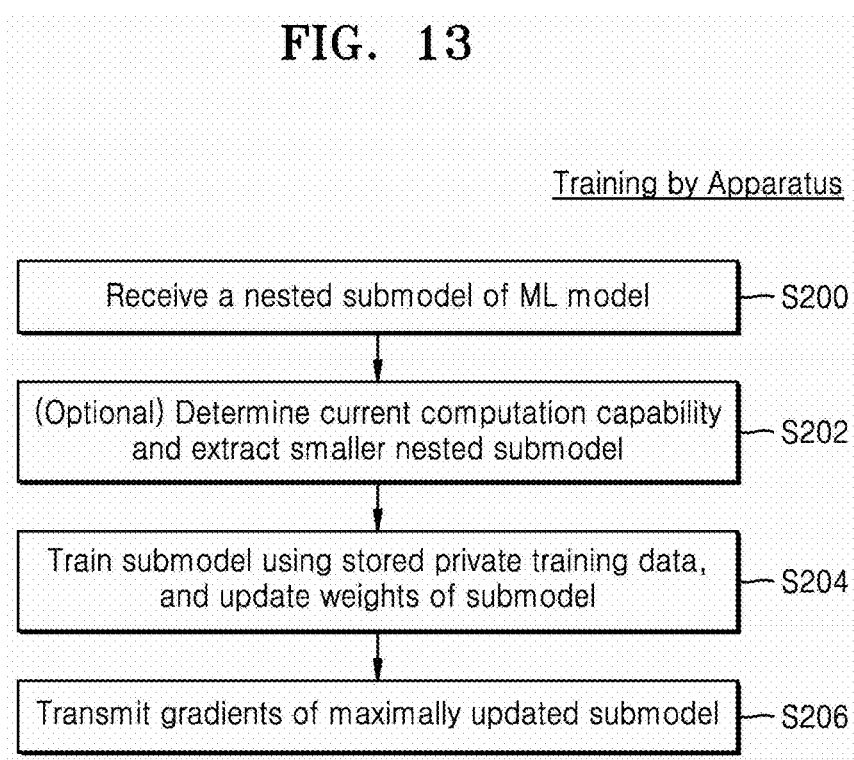

METHOD, SYSTEM AND APPARATUS FOR FEDERATED LEARNING

CROSS-REFERENCE TO RELATED APPLICATION(S)

This application is a continuation application, claiming priority under § 365(c), of an International application PCT/KR2022/000938, filed on Jan. 18, 2022, which is based on and claims the benefit of a Greece patent application number 20210100067, filed on Feb. 2, 2021, in the Hellenic Industrial Property Organization, and of a European patent application number 21195060.5, filed on Sep. 6, 2021, in the European Patent Office, the disclosure of each of which is incorporated by reference herein in its entirety.

TECHNICAL FIELD

The present disclosure generally relates to methods, systems and apparatuses for training a machine learning (ML) model using federated learning. In particular, the present disclosure relates to a computer-implemented method for performing ordered dropout to dynamically prune the ML model that is being trained based on the capabilities of the devices performing the training and without the need to later retrain the model.

BACKGROUND ART

Over the past few years, advances in deep learning have revolutionised the way people interact with everyday devices. Much of this success relies on the availability of large-scale training infrastructures and the collection of vast amounts of training data. However, users and providers are becoming increasingly aware of the privacy implications of this ever-increasing data collection, leading to the creation of various privacy-preserving initiatives by service providers and government regulators.

Federated Learning is a relatively new subfield of machine learning, ML, that allows the training of ML models without the training data leaving user devices. Instead, federated learning enables individual client devices to collaboratively train a ML model by moving the training computation to the client devices, while keeping all the training data private. During each round of the training process, participating client devices download the latest version of a global model and compute an updated model using their local data (i.e. data that is local to or stored on the client devices). These locally trained models are then sent from the participating client devices back to a central server which aggregates all the received locally trained models to generate an updated version of the global model. This is in contrast to centralised training where the training mechanism (e.g. the central server) has access to all the training data. Client devices can be mobile devices such as smartphones, appliances, wearables, or even servers or systems of entities such as hospitals and organisations. Therefore, it is desirable from data privacy and security perspectives to keep the data on those client devices private and avoid sharing the data with a central server to train a global model.

Another key challenge of deploying federated learning in the wild is the vast heterogeneity of client devices, ranging from low-end Internet of Things, IoT, devices to flagship, high-end smartphones. The differing computational capabilities of these devices means that it can be difficult to implement federated learning of a global model in a reasonable time frame. Typically, the solution is to prevent low-tier devices from participating in the federated learning, which can introduce bias into the end model, or to reduce the size of the model so it can be trained using a large set of devices, which can lead to a lower accuracy model.

Therefore, the present applicant has recognised the need for an improved technique for performing federated learning across client devices.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide methods, systems and apparatuses for training a machine learning (ML) model using federated learning.

Additional aspects will be set forth in part in the description which follows and, in part, will be apparent from the description, or may be learned by practice of the presented embodiments.

In accordance with an aspect of the disclosure, a method (implemented by a server or master node or orchestrator) for training a machine learning (ML) model using federated learning performed by a plurality of client devices is provided. The method includes determining a capability of each client device, associating each client device with a value defining how much of each neural network layer of the ML model is to be included in a submodel to be trained by the each client device, based on the determined capability and generating a submodel of the ML model by using the value associated with the each client device to perform ordered pruning of at least one neural network layer of the ML model.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

Implementations of the present techniques will now be described, by way of example only, with reference to the accompanying drawings, in which:

FIG. 6C shows results from experiments implementing federated learning using ordered dropout according to an exemplary embodiment of the present disclosure, the results showing performance versus dropout rate;

FIG. 12 is a system for training a ML model using federated learning according to an exemplary embodiment of the present disclosure; and FIG. 13 is a flowchart of example steps performed by an apparatus to train a ML model using federated learning according to an exemplary embodiment of the present disclosure.

Throughout the drawings, it should be noted that like reference numbers are used to depict the same or similar elements, features, and structures.

MODE FOR INVENTION

Figure 1:
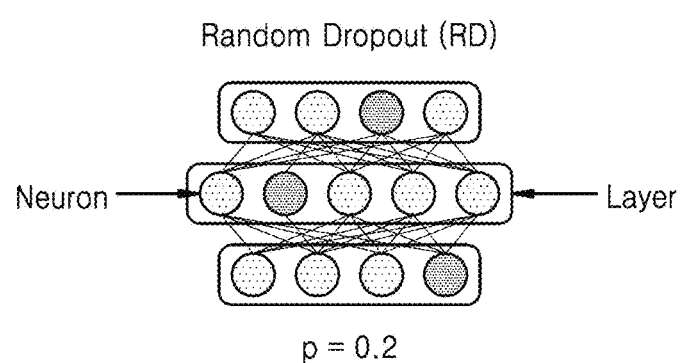
FIG. 1 shows a schematic diagram of random dropout.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In a first approach of the present techniques, there is provided a method (implemented by a server or master node or orchestrator) for training a machine learning (ML) model using federated learning performed by a plurality of client devices, the method comprising: determining a capability of each client device; associating each client device with a value defining how much of each neural network layer of the ML model is to be included in a submodel to be trained by the each client device, based on the determined capability and generating a submodel of the ML model by using the value associated with the each client device to perform ordered pruning of at least one neural network layer of the ML model.

In a related approach of the present techniques, the method for training a machine learning (ML) model using federated learning performed by a plurality of client devices further comprises distributing, during each federated learning training round, a submodel of the ML model to each client device based on the value associated with each client device.

In a related approach of the present techniques, there is provided a central computing device (which may be a server, a master node, or orchestrator device) for training a machine learning (ML) model using federated learning performed by a plurality of client devices. The central computing device comprises at least one processor coupled to memory, arranged to: determine a capability of each client device; associating each client device with a value defining how much of each neural network layer of the ML model is to be included in a submodel to be trained by the each client device, based on the determined capability, generate a submodel of the ML model by using the value associated with each client device to perform ordered pruning of at least one neural network layer of the ML model.

The central computing device is further arranged to distribute, during each federated learning training round, a submodel of the ML model to each client device based on the value associated with each client device.

The machine learning, ML, model may be considered a super-model, from which multiple nested submodels may be extracted and trained. The term "nested submodels" is used herein to mean that the submodels are of graduated sizes and are located one inside the other. Thus, a submodel which is sent to a client device for training may itself contain nested submodels. For example, the super-model may comprise a plurality of nested submodels A, B, C, D and E, where A is the largest submodel (and may be more suitable for a higher tier client device) and E the smallest submodel (and may be more suitable for a low tier client device). Submodel A contains, in a nested manner, submodels B to E; submodel B contains, in a nested manner, submodels C to E; and so on. Thus, when submodel A is sent to a client device, the client device has a choice of five models to train: A, B, C, D or E. Similarly, when submodel E is sent to a client, the client device is only able to train submodel E. Thus, it will be understood that due to the nested nature of the submodels within the super-model, a submodel itself may comprise submodels.

Advantageously, when the submodel is sent to client devices for training via federated learning, each client device may train the received submodel instead of needing to train the larger/whole super-model. For example, if submodel A (which contains models B to E) is sent to a client device, the client device may train submodel A. Similarly, when the submodel is sent to client devices, each client device may extract one of the nested submodels from the received submodel based on the client device's current capabilities, and train the extracted submodel instead of attempting to train the whole submodel. For example, if submodel A is sent to a client device but the submodel is too large for the client device to train at that time, the client device may extract one of the nested submodels (B to E) and train that extracted, nested submodel instead. Thus, client devices of different specifications are able to participate in the training process. Furthermore, a client device is able to extract and train a submodel from the received submodel based on its capabilities or resources at training time. That is, a client device which is being used to perform other tasks at training time (e.g. capturing images, participating in a call, etc.) may still be able to participate in training by extracting a submodel based on the resources available for training at that particular time.

The submodel which is sent to a client device is based on the maximum or ideal computation capability of each client device. This ensures the client device receives a submodel that it would be able to train. However, as noted above, the submodel may contain nested submodels itself, which enables the each client device to extract a smaller submodel if the each client device does not have the resources to perform training of the received submodel.

Associating each client device with a value may comprise associating each client device with a value from a distribution of discrete values. The distribution of discrete values may be a uniform distribution. Alternatively, the distribution of discrete values may be a non-uniform distribution which reflects a distribution of capabilities of the plurality of client devices.

A number of discrete values in the distribution of discrete values may depend on any one or more of: a number of device capability levels, a size or width of the neural network layers, and a number of device capability levels included in the ML model.

Generating a plurality of nested submodels of the ML model may comprise using the value associated with each client device to perform ordered pruning of each prunable neural network layer or a plurality of prunable neural network layers of the ML model. That is, two or more neural network layers which could be pruned (i.e. are "prunable") may be pruned using the same value associated with each client device. The prunable layers may be the convolutional layers and linear layers, for example. For example, layers such as 'batchNorm' need special handling per submodel and RNN layers may be implemented as linear layers, and thus benefit from the same advantages.

Alternatively, generating a plurality of nested submodels of the ML model may comprise using the value associated with each client device to perform ordered pruning of one neural network layer of the ML model, and using at least one further value to perform ordered pruning of at least one further neural network layer of the ML model. That is, two prunable neural network layers may be pruned using two different values.

The step of distributing, during each federated learning training round, a submodel of the ML model to each client device may comprise broadcasting a submodel generated using a value to each client device associated with the value, for local training by the client devices.

The method may further comprise receiving, during each federated learning training round, gradients of a maximally updated submodel from each client device, where each gradient corresponds to changes in weights of the submodel.

The method may further comprise: aggregating, using the received gradients, the changes in weights of the submodel received from each client device; and updating the ML model.

The method may comprise repeating the generating and distributing steps using the updated ML model.

In a second approach of the present techniques, there is provided a system for training a machine learning (ML) model using federated learning performed by a plurality of client devices, the system comprising: a plurality of client devices; and at least one processor coupled to memory and arranged to: determine a capability of each client device, associate each client device with a value defining how much of each neural network layer of the ML model is to be included in a submodel implemented by the each client device, based on the determined capability and generate a submodel of the ML model by using the value associated with the each client device to perform ordered pruning of at least one neural network layer of the ML model.

The at least one processor of the system arranged to distribute, during each federated learning training round, a submodel of the ML model to each client device based on the value associated with the each client device.

The features described above with respect to the first approach apply equally to the second approach.

In a third approach of the present techniques, there is provided an apparatus for training a machine learning, ML, model using federated learning, the apparatus comprising: storage storing private training data collected by the apparatus; and at least one processor coupled to memory and arranged to: receiving, from a server, a submodel of the ML model generated based on a capability on the apparatus; training the submodel using the stored private training data and updating weights of the submodel; and transmitting, to the server, gradients of a maximally updated submodel, where each gradient corresponds to changes in weights of the submodel.

The processor may be arranged to: determine a current computation capability of the apparatus; and extract, from the received submodel, a smaller nested submodel for training using the stored private training data.

The apparatus may further comprise at least one image capture device for capturing images or videos to be used as the private training data, and/or at least one interface for collecting data which forms the private training data.

In a related approach of the present techniques, there is provided a non-transitory data carrier carrying processor control code to implement the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages, functional programming languages, and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an Application Specific Integrated Circuit (ASIC) or Field Programmable Gate Array (FPGA), or code for a hardware description language such as Verilog (RTM) or Very high speed integrated circuit Hardware Description Language (VHDL). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

The methods described above may be wholly or partly performed on an apparatus, i.e. an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

As mentioned above, the present techniques may be implemented using an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Broadly speaking, the present techniques generally relate to methods, systems and apparatuses for training a machine learning, ML, model using federated learning. In particular, the present disclosure relates to a computer-implemented method for performing ordered dropout to prune the ML model and generate nested submodels for training by client devices based on the capabilities of the client devices. Advantageously, this means that the nested submodels of the ML model can be trained using private training data that is stored only on the client devices—this enables the ML model to be trained on useful training data without compromising the privacy of users of the client devices. Further advantageously, this means that the training of the ML model is distributed across multiple devices in a way that takes into account the computing capabilities of the devices.

As will be explained in more detail below with respect to the figures, the present techniques provide a novel adaptive training framework that enables heterogeneous devices to participate in federated learning by dynamically adapting model size—and thus computation, memory and data exchange sizes—to the available client device resources. To this end, Ordered Dropout (OD) is introduced. OD is a mechanism for run-time ordered (importance-based) pruning, which enables submodels to be extracted and trained in a nested manner. As such, OD enables all client devices to participate in the federated learning process independently of their capabilities by training a submodel of an original global model, while still contributing knowledge to the global model. Alongside OD, the present techniques provide a self-distillation method from the maximal supported submodel on a client device to enhance the feature extraction of smaller nested submodels. Finally, the present framework has the additional benefit of producing models that can be dynamically scaled during inference, based on the hardware and load constraints of the device.

As will be explained below, evaluation of the federated learning process using ordered dropout shows that the present techniques provide significant accuracy benefits over the baselines across diverse datasets and networks, while allowing for the extraction of submodels of varying floating point operations per second (FLOPs) and sizes without the need for retraining.

By design, federated learning assumes that the data are not independent or identically distributed, i.e., non-IID, across client devices and that client devices might be unreliable (e.g., offline). However, it is noted that the techniques of the present disclosure may be applied to an IID setting also.

Typically federated learning of a machine learning, ML, model requires multiple rounds where i) a number of participating client devices are selected, ii) the latest ML model is sent to the client devices from a central server or orchestrator of the federated learning, iii) the client devices use their local data to update the ML model (local training), iv) the client devices share the updated model with the server, and v) the resulting models (one per client) are aggregated by the server into a single ML model before starting another round. A number of other mechanisms are also in place to ensure privacy, security and robustness.

However, federated learning is generally bandwidth intensive—the whole global model needs to be sent to client devices participating in every round (downstream) and, in turn, the devices need to send back the updated gradients (upstream). Furthermore, federated learning is generally resource intensive—training a neural network takes significantly more compute resources and memory due to the back propagation step of the training process and its data dependencies (i.e. activations, optimiser data, etc.).

Moreover, client devices in-the-wild may be very heterogeneous with vastly different computational capabilities. For example, smartphones may range from budget, low tier versions to flagship, high tier devices, with potentially unique data in each. Even simple Internet of Things, IoT, devices (another form of low-tier device) could store data relevant to training a ML model, as could wearable devices, virtual assistant devices and other limited-resource consumer devices. Since some client devices are resource-constrained, they may prolong the training process as the training may need to wait for client devices to perform the training and return the updated gradients, i.e. the training may need to wait for stragglers. Similarly, some client devices do not participate in the training process at all, such that they are actively dropped or excluded from model training altogether due to their inability to perform the training or perform the training within a required time frame. This has repercussions on fairness, bias and accuracy of the global model due to the 'unseen' data being missing from the training process. As it is low tier devices which are most resource constrained and therefore most often do not participate, the ML models trained by federated learning are at risk of being trained almost exclusively on higher tier devices, introducing bias due to differences in social demographics that own low vs high tier devices, and generally just missing out on key data.

Current solutions generally either aim just for bandwidth gains—by compressing the communication channel or reducing the size of the trained model, e.g. via pruning—or use a dropout technique to reduce load on the clients during the training procedure. Most current solutions disregard the compute and/or memory heterogeneity of the clients and as such, do not allow for resource-constrained training.

Therefore, there is a need to train big and globally accurate models across heterogeneous devices in a federated setting. The present techniques use Ordered Dropout, which satisfies this need by means of carefully structured network pruning. More specifically, the present techniques order knowledge representation in nested submodels of the original global model. In other words, a large global model may be used to generate smaller sub-models that are formed by pruning parts of the neural network underlying the global model. The models are nested in the sense that a larger submodel includes all smaller submodels. These smaller sub-models may be more readily trained using resource-constrained devices. The sub-models may be generated to suit the computational capabilities of the client devices that are participating in the federated learning process. This increases the likelihood that resource-constrained devices are able to participate in the training process, which thereby reduces the risk of the problems mentioned above.

The present techniques allow for adaptive training procedure, which allows heterogeneous devices to participate in training by adapting computation and memory requirements to the given resources. The present techniques also load balances computation and, thus, limits stragglers. The trained model exhibits ordered structure, which enables efficient deployment to a wide range of devices. The resulting model can be dynamically adapted during inference too so as to accommodate a wide range of devices and run-time conditions (e.g., device load) upon deployment.

FIG. 1 shows a schematic diagram of random dropout as applied, for example, to neurons and filters in convolutional layers.

Random dropout is a mechanism where, at a given layer within a neural network of a machine learning model, a number of units (i.e. neurons or channels) are stochastically dropped from the computation. Random dropout is typically used during training for regularisation purposes. In every batch a different, random, set of units is dropped. The number of units to be kept is typically controlled by a probability p.

For example, in FIG. 1, the dark neurons are randomly selected for participation—while maintaining at least one neuron in each layer, along with associated connections between the selected neurons—whereas the remaining greyed-out neurons will not participate in the computation.

Figure 2A:
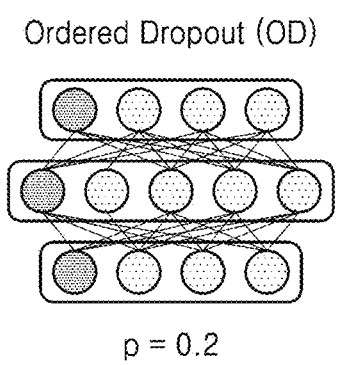
FIG. 2A shows a schematic diagram of ordered dropout according to an exemplary embodiment of the present disclosure.
Figure 2B:
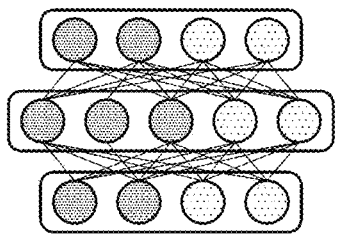
FIG. 2B shows a schematic diagram of ordered according to an exemplary embodiment of the present disclosure.
Figure 2C:
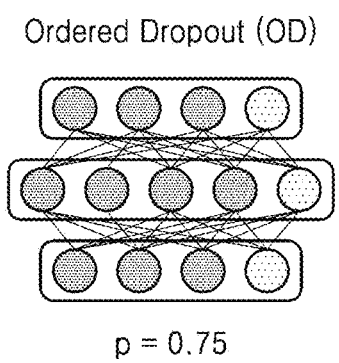
FIG. 2C shows a schematic diagram of ordered according to an exemplary embodiment of the present disclosure.

FIGS. 2A, 2B and 2C show a schematic diagram of ordered dropout according to an exemplary embodiment of the present disclosure.

Ordered Dropout (OD) is a mechanism for ordered, i.e. importance-based, pruning. The variable $p \in (0,1]$ still defines how much of each layer of the network is to be included (dark shading), but the dropped neurons (greyed out) are not randomly selected. Instead, they are dropped in a predefined ordering.

For example in FIGS. 2A, 2B and 2C, the p left-most units are kept whereas the (1−p) units on the right are dropped: compare particularly FIG. 2A with FIG. 1, which both show an example of p=0.2. In this way the p-pruned submodels are nested, with higher p value submodels including the same neurons as lower p value submodels. As will be discussed later, each of the p-pruned submodels in FIGS. 2A, 2B and 2C (p=0.2, 0.5, 0.75) may correspond to a class of devices with specific computational and memory footprint, i.e. higher p value for higher tier devices. In one embodiment, the class of devices means clustered tiers of a plurality of heterogeneous devices depend on their hardware capacity. The p value may be determined according to a class of devices.

By performing OD during training, the network is encouraged to emphasise learning towards the top-ranked units as these units will be dropped less often. This also means computation can be adapted by dynamically dropping the least important neurons during inference.

Figure 3:
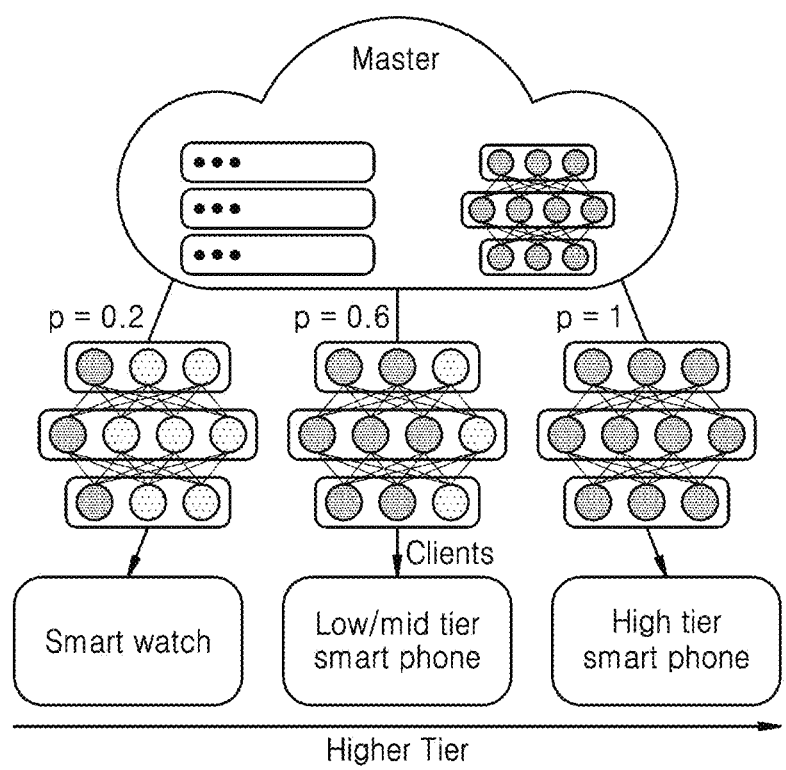
FIG. 3 shows a schematic diagram of federated learning using ordered dropout to generate nested submodels for training by client devices according to an exemplary embodiment of the present disclosure.

FIG. 3 shows a schematic diagram of federated learning using ordered dropout to generate nested submodels for training by client devices according to an exemplary embodiment of the present disclosure. A remote or cloud server stores a master, global ML model which is to be trained using federated learning. Ordered Dropout (OD) is used for ordered, importance-based, pruning of the global ML model. By pruning the ML model, submodels of the global model are generated, where each submodel has a desired computational and memory footprint that makes it suitable for training by one or more client devices. The generation of the submodels is controlled through the variable $p \in (0,1]$, which defines how much of each layer of the network is to be included in the target submodel. Each device d is classified into a device tier c, based on the device's hardware capabilities, and is associated with a maximum p value ($p^{(c)}_{max}$). Thus, as shown in FIG. 3, a submodel where more units have been dropped may be generated for low-tier devices such as wearables, and a submodel where no units have been dropped may be generated for higher-tier devices such as premium smartphones.

At each FL training round, a submodel is distributed to each of the participating devices based on their capabilities. Since $p^{(c)}_{max} \leq 1$, this means that the present techniques enable i) downstream bandwidth gains (as smaller models are distributed), ii) compute gains (by not propagating calculations to the pruned neurons) and iii) upstream gains (by sending only the gradients of the non-pruned neurons).

The present techniques also provide the following benefits:

Ability to train larger global models, due to the decoupling of global model size and target device capabilities.

More devices are able to participate and their non-IID (independent and identically distributed) data to be included in the training procedure, leading to increased fairness and accuracy.

Fewer stragglers present due to overweight models for specific device, leading to faster convergence.

Figure 4A:
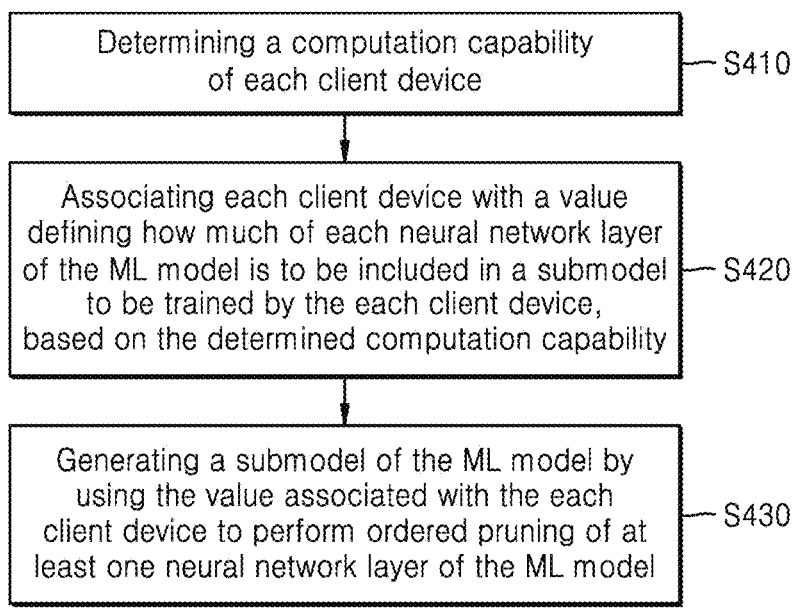
FIG. 4A is a flowchart of example steps performed by a server to train a ML model using federated learning according to an exemplary embodiment of the present disclosure.

FIG. 4A is a flowchart of example steps performed by a server to train a ML model using federated learning and ordered dropout according to an exemplary embodiment of the present disclosure. Broadly, the ordered dropout method is parameterised with respect to: i) a value of a dropout rate $p \in (0,1]$ per layer, ii) a set of candidate values P, such that $p \in P$.

A primary hyperparameter of OD is the dropout rate p which defines how much of each layer is to be included, with the rest of the units dropped in a structured and ordered manner. The value of p is selected by sampling from the dropout distribution $D_p$ which is represented by a set of discrete values $P = \{s_1, s_2, \ldots, s_{|P|}\}$ such that $0 < s_1 < \ldots < s_{|P|} \leq 1$ and probabilities $P(p=s_i) > 0, \forall i \in [|P|]$ such that $\tau_{i=1}^{|P|} P(p=s_i) = 1$. For instance, a uniform distribution over P is denoted by $p \sim \mathcal{U}_P$ (i.e. $D = \mathcal{U}$). In the experiments explained below, a uniform distribution over the set $P = \{i/k\}_{i=1}^{k}$, which is referred to as $\mathcal{U}_k$ (or uniform-k). The discrete nature of the distribution stems from the innately discrete number of neurons or filters to be selected.

The method comprises determining a capability of each client device of a plurality of client devices that are to be used to train the ML model (step S410). This may comprise determining the computing or processing capability and the memory capacity of each client device, for example. The hardware capability of each client device may be obtained from the client devices (e.g. by requesting the information), in which case the transient computational load of the device may also be used to determine computing or processing capability and the memory capacity of each client device.

In one embodiment, the hardware capability of each client device may be measured by a test operation through entire ML model. When a new device participates to the federated learning, entire ML model sent to the new device and executed. By the execution of a ML model, the hardware capability of new client device can be measured and obtained by a central computing device. The central computing device may determine the p value of the new client device according to the obtained hardware capability of the new client device. In one embodiment, the central computing device may determine the class of the new client device according to the obtained hardware capability of the new client device. The p value of the new client device may be determined according to the class of the new client device.

The method may comprise associating each client device with a value (dropout rate) p defining how much of each neural network layer of the ML model is to be included in a submodel implemented by the each client device, based on the determined capability (step S420)—with the rest of the neurons/channels dropped in an ordered manner. The client devices may be grouped into groups or sets based on having similar capabilities. For example, client devices which have limited processing and/or memory capabilities may be grouped together (such as low tier smartphones and smartwatches), while client devices which have good processing and/or memory capabilities may be grouped together (such as top tier smartphones and tablets). This enables submodels to be sent out to groups of client devices based on the hardware capabilities of the devices in the group; i.e. groups of devices with the same $p^{(c)}_{max}$.

The method may comprise generating a submodel of the ML model by using the value associated with the each client device to perform ordered pruning of at least one neural network layer of the ML model (step S430).

The ordered pruning, also referred to herein as ordered dropout, works as follows. A dropout rate p is sampled from the given distribution of discrete candidate values P, e.g. uniform distribution of discrete values $P=[s_1, s_2, \ldots, s_{|P|}]$, $0<s_1<s_2<\ldots<s_{|P|}<=1$, denoted as $p\sim U_P$ (i.e. D=U). The discrete nature of the distribution stems from the innately discrete number of neurons/filters to be selected.

Associating each client device with a value p may comprise associating each client device with a value from a distribution of discrete values. The distribution of discrete values may be a uniform distribution. Alternatively, the distribution of discrete values may be a non-uniform distribution which reflects a distribution of capabilities of the plurality of client devices. Thus, the distribution followed by p can be different to uniform to reflect specific data distributions per client (e.g. flagship devices can have significantly more data and thus might need more capacity in the network and more fine-grained granularity of submodels). For ease of explanation, the following will assume P is a uniform discrete distribution.

A number of discrete values |P| in the distribution of discrete values may depend on: a number of different device tiers in the wild, i.e. a number of device capability levels; a size (width) of the network; and a number of device capability levels included in the ML model.

This p value can be the same for all layers of a given network, or can be configured per layer L, leading to $p_L \sim D^L_P$. We will continue with a single p along all layers for ease of understanding without hurting the generality of the approach.

If a given layer L has $K_L$ width (neurons for linear layers, filters for convolutional layers), then the submodel for a given p is defined as a masked version, with all neurons/filters $0:\text{ceil}((p)*K_L)$ included and $\text{ceil}((p)*K_L):K_L$ pruned. The unnecessary connections between pruned neurons are also removed.

This results in gains both in terms of total FLOPs (forward and backward pass) and parameters. The latter also translates to optimiser (e.g. momentum vectors) and gradient memory gains.

For every linear and convolution layer the number of weight parameters and FLOPs is reduced by approximately $p^2$, the precise formula would be slightly different due to present of ceil operation, i.e. $\text{ceil}(p*K_1)*\text{ceil}(p*K_2)/(K_1*K_2)$, where $K_1, K_2$ correspond to the number of input and output neurons/channels, respectively. For the bias term, reduction is by factor of p, more precisely $\text{ceil}(p*K_2)/K_2$.

For the normalization layers, the reduction in both FLOPs and number of parameters is the same as for bias in linear/convolutional layers. The same applies for all the activation and pooling layers in terms of FLOPs.

The p-pruned subnetwork is denoted Fr with weights $w_p$, where F and w are the original (global model) network and weights respectively. Beneficially, the network $F_p$ can be directly obtained post training without the need to fine tune, thereby eliminating the need to access any labelled data.

Thus, the present techniques provide a pruning-aware training mechanism to train DNNs with this ordered pruning capability. To achieve this, the present techniques:

Pick the global model architecture and initialise it either randomly or via a pre-trained network.

Create a uniform distribution $U_P$ with |P| discrete values, see previous slide. Each p value translates to a submodel of the global model with fewer FLOPS and parameters.

Cluster the devices to participate in training into N tiers and associate a $p_{max}$ value for each cluster based on the performance of the model on devices of this cluster. This $p_{max}$ value represents the maximum capacity of the network that the devices in that cluster can handle without sacrifices (defined by a service level objective (SLO)).

This association can be accomplished analytically (through network and hardware FLOPs throughput) or via profiling (i.e. time execution on device). For this step, access to data is not required.

The step S420 of generating a submodel of the ML model may comprise using the value p associated with each client device to perform ordered pruning of each neural network layer of the ML model.

Alternatively, the step S420 of generating a submodel of the ML model may comprise using the value p associated with each client device to perform ordered pruning of one neural network layer of the ML model, and using at least one further value to perform ordered pruning of at least one further neural network layer of the ML model.

Regarding the steps of S410, S420 and S430, the details will be described later in FIG. 4B.

Figure 4B:
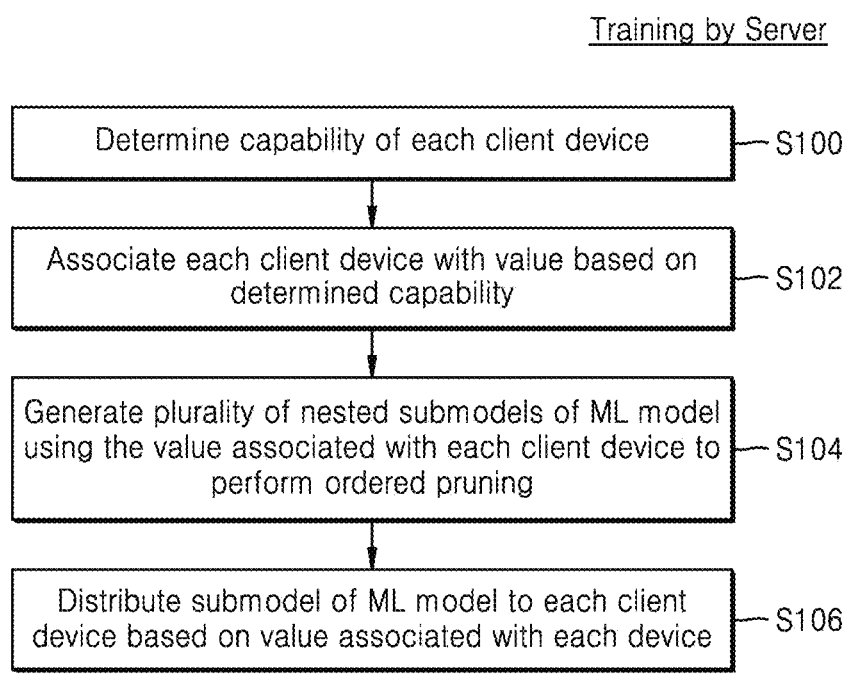
FIG. 4B is a flowchart of example steps performed by a server to train a ML model using federated learning according to an exemplary embodiment of the present disclosure.

FIG. 4B is a flowchart of example steps performed by a server to train a ML model using federated learning and ordered dropout according to an exemplary embodiment of the present disclosure. Broadly, the ordered dropout method is parameterised with respect to: i) a value of a dropout rate $p \in (0,1]$ per layer, ii) a set of candidate values P, such that $p \in P$ and iii) a sampling method of p over the set of candidate values, such that $p \sim D_p$, where $D_p$ is the distribution over P.

A primary hyperparameter of OD is the dropout rate p which defines how much of each layer is to be included, with the rest of the units dropped in a structured and ordered manner. The value of p is selected by sampling from the dropout distribution $D_p$ which is represented by a set of discrete values $P=\{s_i, s_2, \ldots, s_{|P|}\}$ such that $0<s_1<\ldots<s_{|P|}\leq 1$ and probabilities $P(p=s_i)>0, \forall i \in [|P|]$ such that $\Sigma_{i=1}^{|P|} P(p=s_i)=1$. For instance, a uniform distribution over P is denoted by $p \sim \mathcal{U}_P$ (i.e. $D=\mathcal{U}$). In the experiments explained below, a uniform distribution over the set $P=\{i/k\}_{i=1}^{k}$, which is referred to as $\mathcal{U}_k$ (or uniform-k). The discrete nature of $\mathcal{U}$ the distribution stems from the innately discrete number of neurons or filters to be selected.

The method comprises determining a capability of each client device of a plurality of client devices that are to be used to train the ML model (step S100). This may comprise determining the computing or processing capability and the memory capacity of each client device, for example. The hardware capability of each client device may be obtained from the client devices (e.g. by requesting the information), in which case the transient computational load of the device may also be used to determine computing or processing capability and the memory capacity of each client device.

In one embodiment, the hardware capability of each client device can be measured by a test operation through entire ML model. When a new device participates to the federated learning, entire ML model sent to the new device and executed. By the execution of a ML model, the hardware capability of new client device can be measured and obtained by a central computing device. The central computing device may determine the p value of the new client device according to the obtained hardware capability of the new client device. In one embodiment, the central computing device may determine the class of the new client device according to the obtained hardware capability of the new client device. The p value of the new client device may be determined according to the class of the new client device.

The method may comprise associating each client device with a value (dropout rate) p defining how much of each neural network layer of the ML model is to be included in a target submodel implemented by the client device, based on the determined capability (step S102)—with the rest of the neurons/channels dropped in an ordered manner. The client devices may be grouped into groups or sets based on having similar capabilities. For example, client devices which have limited processing and/or memory capabilities may be grouped together (such as low tier smartphones and smartwatches), while client devices which have good processing and/or memory capabilities may be grouped together (such as top tier smartphones and tablets). This enables submodels to be sent out to groups of client devices based on the hardware capabilities of the devices in the group; i.e. groups of devices with the same $p^{(c)}_{max}$.

The method may comprise generating a plurality of submodels of the ML model by using the value associated with each client device to perform ordered pruning of at least one neural network layer of the ML model (step S104).

The ordered pruning, also referred to herein as ordered dropout, works as follows. A dropout rate p is sampled from the given distribution of discrete candidate values P, e.g. uniform distribution of discrete values $P=[s_1, s_2, \ldots, s_{|P|}]$, $0<s_1<s_2<\ldots<s_{|P|}<=1$, denoted as $p \sim U_P$ (i.e. D=U). The discrete nature of the distribution stems from the innately discrete number of neurons/filters to be selected.

Associating each client device with a value p may comprise associating each client device with a value from a distribution of discrete values. The distribution of discrete values may be a uniform distribution. Alternatively, the distribution of discrete values may be a non-uniform distribution which reflects a distribution of capabilities of the plurality of client devices. Thus, the distribution followed by p can be different to uniform to reflect specific data distributions per client (e.g. flagship devices can have significantly more data and thus might need more capacity in the network and more fine-grained granularity of submodels). For ease of explanation, the following will assume P is a uniform discrete distribution.

A number of discrete values |P| in the distribution of discrete values may depend on: a number of different device tiers in the wild, i.e. a number of device capability levels; a size (width) of the network; and a number of device capability levels included in the ML model.

This p value can be the same for all layers of a given network, or can be configured per layer L, leading to $p_L \sim D^L_P$. We will continue with a single p along all layers for ease of understanding without hurting the generality of the approach.

If a given layer L has $K_L$ width (neurons for linear layers, filters for convolutional layers), then the submodel for a given p is defined as a masked version, with all neurons/filters $0:\text{ceil}((p)*K_L)$ included and $\text{ceil}((p)*K_L):K_L$ pruned. The unnecessary connections between pruned neurons are also removed.

This results in gains both in terms of total FLOPs (forward and backward pass) and parameters. The latter also translates to optimiser (e.g. momentum vectors) and gradient memory gains.

For every linear and convolution layer the number of weight parameters and FLOPs is reduced by approximately $p^2$, the precise formula would be slightly different due to present of ceil operation, i.e. $\text{ceil}(p*K_1)*\text{ceil}(p*K_2)/(K_1*K_2)$, where $K_1$, $K_2$ correspond to the number of input and output neurons/channels, respectively. For the bias term, reduction is by factor of p, more precisely $\text{ceil}(p*K_2)/K_2$.

For the normalization layers, the reduction in both FLOPs and number of parameters is the same as for bias in linear/convolutional layers. The same applies for all the activation and pooling layers in terms of FLOPs.

The p-pruned subnetwork is denoted $F_r$ with weights $w_p$, where F and w are the original (global model) network and weights respectively. Beneficially, the network $F_p$ can be directly obtained post training without the need to fine tune, thereby eliminating the need to access any labelled data.

The method comprises distributing, during each federated learning training round, a submodel of the ML model to each client device based on the value p associated with each client device (step S106).

Thus, the present techniques provide a pruning-aware training mechanism to train DNNs with this ordered pruning capability. To achieve this, the present techniques:

Pick the global model architecture and initialise it either randomly or via a pre-trained network.

Create a uniform distribution $U_p$ with |P| discrete values, see previous slide. Each p value translates to a submodel of the global model with fewer FLOPS and parameters.

Cluster the devices to participate in training into N tiers and associate a $p_{max}$ value for each cluster based on the performance of the model on devices of this cluster. This $p_{max}$ value represents the maximum capacity of the network that the devices in that cluster can handle without sacrifices (defined by a service level objective (SLO)).

This association can be accomplished analytically (through network and hardware FLOPs throughput) or via profiling (i.e. time execution on device). For this step, access to data is not required.

When ready to begin the federated learning training mechanism, the global model architecture F is initialised with weights $w^0$. The dropout rate space P is selected along with distribution $D_P$, with each p corresponding to a submodel of the global model with varying FLOPS and parameters. The participating devices are clustered into C tiers and a $p^C_{max}$ value is associated with each cluster; $p^{(c)}_{max}$ representing a maximum capacity network that devices in the cluster C can handle without violating a latency or memory constraint.

At the beginning of each communication round t, the number participating devices St and the number of local iterations are selected. The device pool St of available devices is sampled until the required number of devices need to participate is obtained; the required number could be all available clients $A_t$ or a subset of $A_t$, depending on server capacity. When only a subset of $A_t$ is needed, it is possible to oversubscribe client devices relative to a number of devices envisaged as required to train the mode; i.e. select more client devices than needed to train the model, to allow for failures.

The master node (orchestrator)—which may be a server—broadcasts a submodel defined by the $p^C_{max}$ of the corresponding cluster or group of each participating device i, and each client device i receives $w_{p\ max}^i$. This leads to a save in bandwidth due to $p_{max}<=1$.

At each local round t, the device i samples $p_{(i,k)} \sim U_P$, st. $p \in (0, p^C_{max}]$ and updates the respective weights $w_{p(i,k)}$ of the local submodel; the weights may be updated using a suitable rule such as FedAvg. Each device i runs E local iterations (rounds) k, and at the end of the local rounds, each device sends back the gradients of the maximally updated submodel (upstream savings in bandwidth due to $\max(p_{i,k}) <= p^C_{max} <= 1$.

The server aggregates these changes across devices and clusters and updates the global model, to be distributed in the next global federated round, with a different set of devices. A suitable aggregation technique may be used. Since changes with different p values sampled are aggregated, the ordered importance of features is maintained in the training process.

Heterogeneity of the devices leads to heterogeneity in the model updates. This is preferably accounted for in the global aggregation step by utilising the aggregation rule $$w_{s_j}^{t+1} \setminus w_{s_{j-1}}^{t+1} = WA\left(\left\{w_{d_{s_j}}^{(i,t,E)} \setminus w_{d_{s_{j-1}}}^{(i,t,E)}\right\}_{i \in S_t^j}\right),$$

where $w_{s_j} \setminus w_{s_{j-1}}$ are the weights that belong to $F_{s_j}$ but not to $F_{s_{j-1}}$, $w^{t+1}$ the global weights at communication round t+1, $w^{(i,t,E)}$ the weights on client i at communication round t after E local iterations, $S_t^j = i\{i \in S_t : p_{max}^i \geq s_j\}$ a set of clients that have the capacity to update $w_{s_j}$, and WA stands for weighted average, where weights are proportional to the amount of data on each client.

A typical procedure in FL is to perform element-wise averaging to aggregate model updates from clients. However, coordinate-wise averaging of updates may have detrimental effects on the accuracy of the global model, due to the permutation invariance of the hidden layers. Recent techniques tackle this problem by matching clients' neurons before averaging. Unfortunately, doing so is computationally expensive and hurts scalability. By contrast, the present method mitigates such an issue since it exhibits the natural importance of neurons/channels within each hidden layer by design. Ordered dropout thereby acts in lieu of a neuron matching algorithm without the computational overhead.

The step S104 of generating a plurality of nested submodels of the ML model may comprise using the value p associated with each client device to perform ordered pruning of each neural network layer of the ML model.

Alternatively, the step S104 of generating a plurality of nested submodels of the ML model may comprise using the value p associated with each client device to perform ordered pruning of one neural network layer of the ML model, and using at least one further value to perform ordered pruning of at least one further neural network layer of the ML model.

The step S106 of distributing, during each federated learning training round t, a submodel of the ML model to each client device may comprise broadcasting a submodel generated using a value to each client device associated with the value, for local training by the client devices.

The method shown in FIGS. 4A and 4B may further comprise receiving, during each federated learning training round, gradients of a maximally updated submodel from each client device, where each gradient corresponds to changes in weights of the submodel. The method may include receiving the weights directly.

The method shown in FIGS. 4A and 4B may further comprise: aggregating, using the received gradients, the changes in weights of the submodel received from each client device; and updating the ML model.

The method shown in FIGS. 4A and 4B may comprise repeating the generating and distributing steps using the updated ML model.

Training without high-end devices. Imagine the scenario where the model is too heavy for devices in the wild or you do not have enough high-end devices or even that you have this reserved for future next-gen high-end devices. This means that the whole (global) model (p=1) will rarely or never be updated under the current deployment. As such, the global model is actually larger than the maximally trained model.

One solution to this problem is to use federated dropout on client side, so that $p_{max}$ of that cluster of devices is higher. This results in more devices updating a larger part of the network. Alternatively federated dropout may be employed on the server side prior to distribution of the submodels to the client devices, such that the p=1 model is correspondingly smaller due to the randomly dropped neurons/filters, but still might retain higher level neurons/filters that would always be dropped using ordered dropout. Again more devices may therefore contribute to updating a larger part of the network.

Through federated dropout, we are sampling neurons (FC layers) and filters (CONV layers) randomly and uniformly, trading off higher structured budget (p) with random dropout. Formally, previously: $p \sim U_P$, s.t. $p <= p_{max}$. Now: $d \sim U_P$, s.t. $p < p'_{max}$, where $p'_{max} \in (p_{max}, 1]$ and defines the trade-off between federated and ordered dropout. The federated dropout rate is defined as $d = p/p'_{max}$ when $p \in (p_{max}, p'_{max}]$, and d=1 otherwise.

For clarity, d differs from p in the way they translate to dropout in the network. Federated Dropout randomly keeps $\text{ceil}((d)*K)$ of the neurons/filters in the layer. Ordered Dropout drops neurons/filters with indexes $\text{ceil}((p)*K)$ to K, where K is the width of the current layer.

Another solution to this problem is to use quantisation on client side, so that $p_{max}$ of that cluster of devices is higher. This results in more devices updating larger part of the network.

Alternatively, one can use quantised variants of the submodel (weights+activations+gradients) in order to boost $p_{max}$ to higher values. For this reason, the present techniques support multiple quantisation techniques (e.g., linear quantisation with stochastic rounding).

Despite the fact that the compute gains of quantisation are hardware-dependent, quantised models have the added benefit of being able to run on different processors, such as mobile GPUs (float16), NPUs (int8) or DSPs (int8).

Increasing accuracy of small submodels. For small p values, you might aggregate updates from all clients, but the end accuracy can still be low to use realistically.

To solve this problem, we use the structure of the Ordered Dropout of the present techniques, which explicitly enables knowledge distillation between submodel (p) and supermodel ($p_{max}$), where $p_{max}$ is the biggest submodel that the device can handle and p is a sampled value such that $p <= p_{max}$. The loss function is defined as follows:

$$L_{client}(\text{softmax}_p, \text{softmax}_{p_{max}}, y_{label}) = (1-\alpha)*CE(\max(\text{softmax}_p), y_{label}) + \alpha*KL(\text{softmax}_p, \text{softmax}_{p_{max}}, T)$$

where $\text{softmax}_p$ is the softmax output of the sampled submodel, $y_{label}$ is the ground truth label, CE is the cross entropy function, KL is the KL divergence function, $\alpha$ is the relative weight of the two losses and T is the distillation temperature.

Note that this technique boosts accuracy with some extra computation (overhead of one extra forward propagation of submodel $p_{max}$). Since we are still sampling up to $p_{max}$, the device is still able to participate. This technique is expected to be more impactful during the first rounds of the global training process, where the smallest submodels are not yet strong feature extractors.

Picking number of values in distribution. The number of discrete values k we can sample from depends on:

The number of different device tiers in the wild $|D_{tiers}|$. For example, we might want to have three model variants accommodating for high-end, mid-tier and low-end devices. This should be defined by the service operator, based on their needs and the devices to which their service is deployed. As we want to account for extensibility (next-gen devices), we recommend $k>=2*|D_{tiers}|$.

The number of different device load levels we model. Similarly but at runtime, we can also account for the online load a device has, which defines the $p_{max}$ the device can handle temporarily. As such, we can e.g. have quartiles of load (25%, 50%, 75%, 100%) that are associated with different p values. The load level can represent different resource types or a combination of such (e.g. compute, memory, energy, etc.)

The size (width) of the network. $\nabla$ layer 1 in DNN, $\exists |P|l$, max, beyond which the channels/neurons cannot be resolved. Thus $k < \max_i \{|P|_{l, max}\}$.

Performance Evaluation. The federated learning with ordered dropout process of the present techniques (also referred to herein as FjORD) is evaluated on two vision and one text prediction task, shown in Table 1(a) and 1(b) below.

TABLE 1(a)

| Dataset | Model | # Clients | # Samples | Task |
|---|---|---|---|---|
| CIFAR10 | ResNet18 | 100 | 50,000 | Image classification |
| FEMNIST | CNN | 3,400 | 671,585 | Image classification |
| Shakespeare | RNN | 715 | 38,001 | Next character prediction |

(a)Datasets description

TABLE 1(b)

| | p = 0.2 | 0.4 | 0.6 | 0.8 | 1.0 |
|---|---|---|---|---|---|
| | CIFAR10/ResNet18 | | | | |
| MACs | 23M | 91M | 203M | 360M | 555M |
| Params | 456K | 2M | 4M | 7M | 11M |
| | FEMNIST/CNN | | | | |
| MACs | 47K | 120K | 218K | 342K | 491K |
| Params | 5K | 10K | 15K | 20K | 26K |
| | Shakespeare/RNN | | | | |
| MACs | 12K | 40K | 83K | 143K | 216K |
| Params | 12K | 40K | 82K | 142K | 214K |

(b)MACs and parameters per p-reduced network

For CIFAR10 (Alex Krizhevsky, Geoffrey Hinton, et al. Learning multiple layers of features from tiny images, 2009), use the "CIFAR" version of ResNet18 (Kaiming He, Xiangyu Zhang, Shaoqing Ren, and Jian Sun. Deep Residual Learning for Image Recognition. In Proceedings of the IEEE conference on computer vision and pattern recognition, pages 770-778, 2016.) is used. The dataset is federated by randomly dividing it into equally-sized partitions, each allocated to a specific client, and thus remaining IID in nature. For FEMNIST, a CNN with two convolutional layers followed by a softmax layer is used. For Shakespeare, a RNN with an embedding layer (without dropout) followed by two LSTM (Sepp Hochreiter and Jurgen Schmidhuber. Long short-term memory. Neural computation, 9(8):1735-1780, 1997) layers and a softmax layer is employed. The model's performance of the last epoch on the test set is provided, which is constructed by combining the test data for each client. The top-1 accuracy vision tasks and negative perplexity for text prediction are reported.

FjORD was implemented on top of the Flower (v0.14dev) (Daniel J Beutel, Taner Topal, AkhilMathur, Xinchi Qiu, Titouan Parcollet, and Nicholas D Lane. Flower: A Friendly Federated Learning Research Framework. arXiv preprint arXiv:2007.14390, 2020) framework and PyTorch (v1.4.0) (Adam Paszke, Sam Gross, Francisco Massa, Adam Lerer, James Bradbury, Gregory Chanan, Trevor Killeen, Zeming Lin, Natalia Gimelshein, Luca Antiga, Alban Desmaison, Andreas Kopf, Edward Yang, Zachary DeVito, Martin Raison, Alykhan Tejani, Sasank Chilamkurthy, Benoit Steiner, Lu Fang, Junjie Bai, and Soumith Chintala. PyTorch: An Imperative Style, High-Performance Deep Learning Library. In Advances in Neural Information Processing Systems (NeurIPS), pages 8026-8037, 2019).

All the experiments are performed on a private cloud cluster, consisting of Nvidia V100 GPUs. To scale to hundreds of clients on a single machine, Flower was optimised so that clients only allocate GPU resources when actively participating in a federated client round. An average performance and the standard deviation across three runs for all experiments is reported. To model client availability, up to 100 Flower clients are run in parallel and 10% are sampled at each global round, with the ability for clients to switch identity at the beginning of each round to overprovision for larger federated datasets. Furthermore, client heterogeneity is modelled by assigning each client to one of the device clusters. The following setups are provided:

Uniform-{5,10}: This refers to the distribution, i.e. $p \sim_k$, with k=5 or 10.

Drop Scale $\in \{0.5, 1.0\}$: This parameter affects a possible skew in the number of devices per cluster. It refers to the drop in clients per cluster of devices, when going to higher p's. Formally, for uniform-n and drop scale ds, the high-end cluster n contains $1 - \Sigma_{i=1}^{n-1} dsn$ of the devices and the rest of the clusters contain dsn each. Hence, for ds=1.0 of the uniform-5 case, all devices can run the p=0.2 subnetwork, 80% can run the p=0.4 and so on, leading to a device distribution of (0.2, . . . , 0.2). This percentage drop is half for the case of ds=0.5, resulting in a larger high-end cluster, e.g. (0.1, 0.1, . . . , 0.6).

Baselines. To assess the performance against the state-of-the-art, FjORD is compared with the following baselines: i) Extended Federated Dropout (eFD), ii) with eFD (w/ eFD). eFD builds on top of the technique of Federated Dropout (FD) [?], which adopts a Random Dropout (RD) at neuron/filter level for minimizing the model's footprint. However, FD does not support adaptability to heterogeneous client capabilities out of the box, as it inherits a single dropout rate across devices. For this reason, an extension to FD is proposed, allowing to adapt the dropout rate to the device capabilities, defined by the respective cluster membership. It is clear that eFD dominates FD in performance and provides a tougher baseline, as the latter needs to impose the same dropout rate to fit the model at hand on all devices, leading to larger dropout rates (i.e. uniform dropout of 80% for full model to support the low-end devices).

In order to evaluate the performance of Fjord, it is compared to the two baselines, eFD and OD+eFD. The uniform-5 setup is considered with drop scale of 1.0 (i.e. uniform clusters). For each baseline, one independent model $F_p$ is trained, end-to-end, for each p. For eFD, what this translates to is that the clusters of devices that cannot run model $F_P$ compensate by randomly dropping out neurons/filters. It is pointed out that p=0.2 is omitted from the eFD results as it is essentially not employing any dropout whatsoever. For the case of FjORD+eFD, the RD is controlled by capping it to d=0.25. This allows for larger submodels to be updated more often—as device belonging to cluster c can now have $p_{max}^c \rightarrow p_{max}^{c+1}$ during training where c+1 is the next more powerful cluster—while at the same time it prevents the destructive effect of too high dropout values shown in the eFD baseline.

Figure 5:
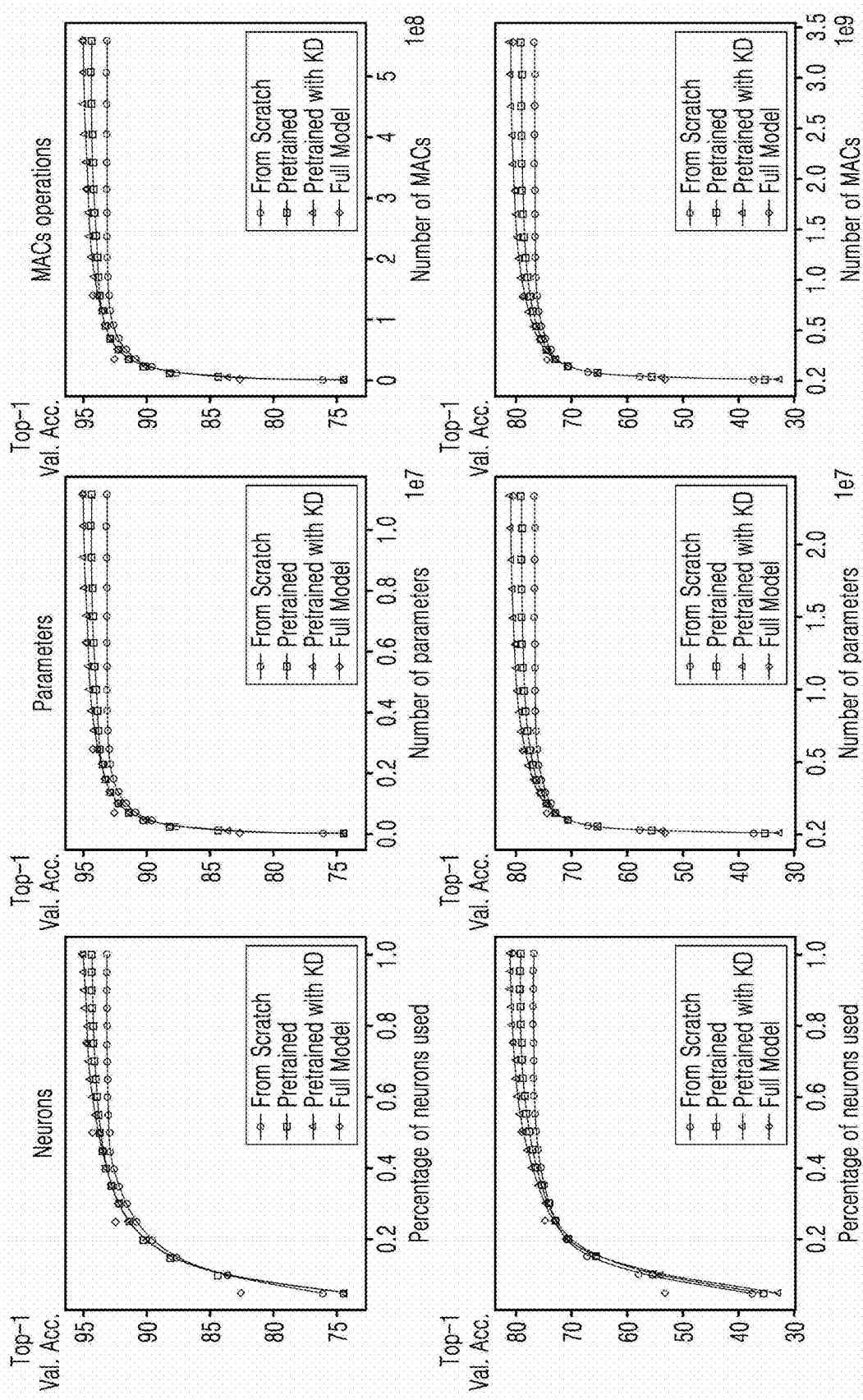
FIG. 5 shows results from experiments implementing federated learning using ordered dropout according to an exemplary embodiment of the present disclosure.

FIG. 5 shows results from experiments implementing federated learning using ordered dropout according to an exemplary embodiment of the present disclosure. In FIG. 5, the top row shows experiments performed on CIFAR-10/Resnet18, and the bottom row shows experiments performed on CIFAR-100/WideResNet28_8. The graphs show the top-1 validation accuracy vs network footprint (neurons, parameters, MACs) on classification tasks. The from scratch data is based on a model trained from random initialisation with ordered dropout; the pretrained data is based on a model trained from pretrained model initialisation with ordered dropout; the pretrained with knowledge distillation (KD) data is based on training smaller submodels with ordered dropout using knowledge distillation; and the full model data shows the ordered dropout submodels trained end-to-end without ordered dropout. The preliminary experiments show desired properties on classification tasks using ResNet based networks in non-federated learning setup, where we only consider one node. The present techniques lead to: ordered representation of learned models; comparable or even better performance than models trained from scratch; even better results than models trained from scratch.

Figure 6A:
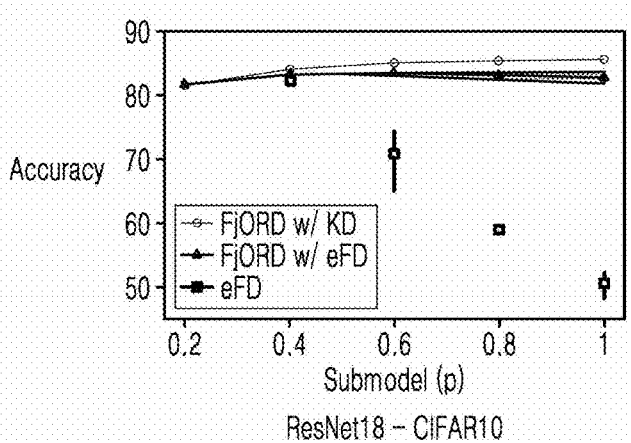
FIG. 6A shows results from experiments implementing federated learning using ordered dropout according to an exemplary embodiment of the present disclosure, the results showing performance versus dropout rate.
Figure 6B:
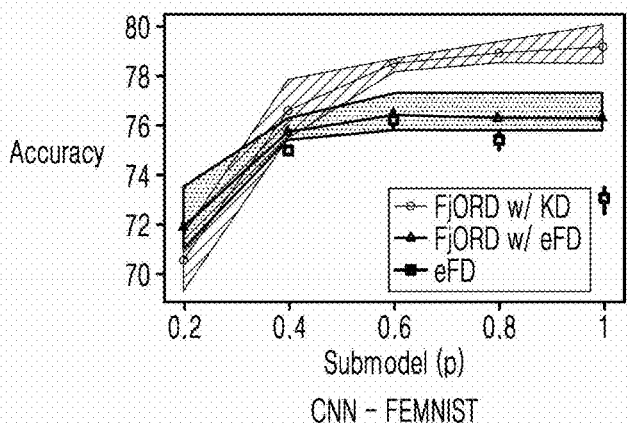
FIG. 6B shows results from experiments implementing federated learning using ordered dropout according to an exemplary embodiment of the present disclosure, the results showing performance versus dropout rate.

FIGS. 6A, 6B and 6C show results from experiments using ResNet18-CIFAR 10, CNN-FEMNIST and RNN-Shakespeare datasets according to an exemplary embodiment of the present disclosure. A uniform distribution $p \sim U_k$ with 5 discrete values (i.e. k=5) was applied. An ordered dropout model with knowledge distillation (labelled FjORD w/ KD in the Figure) was compared with extended federated dropout 'eFD' and FjORD with eFD. Extended federated dropout is essentially the process of provided a p-pruned submodel by random dropout rather than ordered dropout. i.e. whereas federated dropout 'FD' does not support client heterogeneity due to its single dropout rate, eFD allows the dropout rate to adapt to device capabilities (based on p). FjORD+eFD corresponds to the case outlined above whereby federated dropout is applied to the model at the server end in order to update a larger part of the model from lower-tier devices.

As can be seen, FjORD w/ KD outperforms eFD across all datasets with improvements between 1.53-34.87 percentage points (pp) (19.22 pp avg. across p values) on CIFAR10, 1.57-6.27 pp (3.41 pp avg.) on FEMNIST and 0.01-0.82 points (p) (0.46 p avg.) on Shakespeare. Compared to FjORD+eFD, FjORD achieves performance gains of 0.71-2.66 pp (1.79 avg.), up to 2.56 pp (1.35 pp avg.) on FEMNIST and 0.12-0.22 p (0.18 pp avg.) on Shakespeare. Across all tasks, FjORD is able to improve its performance with increasing p due to the nested structure of its ordered dropout method. We also conclude that eFD on top of FjORD does not seem to lead to better results. Interestingly, given the heterogeneous pool of devices, to obtain the highest performing model for eFD, multiple models have to be trained (i.e. one per device cluster). For instance, the highest performing models for eFD are $F_{0.4}$, $F_{0.6}$ and $F_{0.4}$ for CIFAR10, FEMNIST and Shakespeare respectively, which can be obtained only a posteriori; i.e. after all model variants have been trained. Instead, despite the device heterogeneity, FjORD requires a single training process that leads to a global model that significantly outperforms the best model of eFD (by 2.98 and 2.73 pp for CIFAR10 and FEMNIST, respectively, and 0.13 p for Shakespeare), while allowing the direct, seamless extraction of submodels due to the nested structure of OD.

Figure 7A:
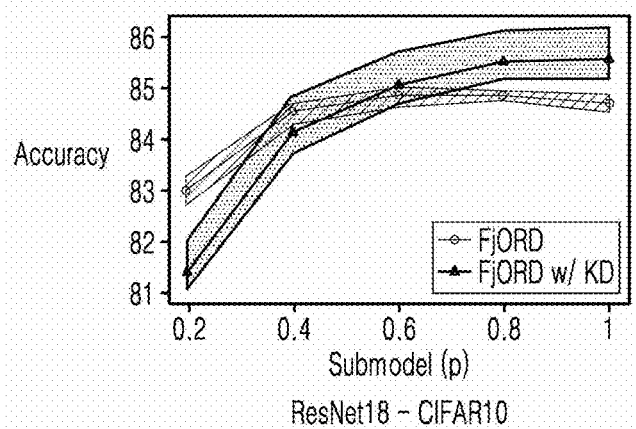
FIG. 7A shows results from ablation experiments performed using federated learning using ordered dropout according to an exemplary embodiment of the present disclosure.
Figure 7B:
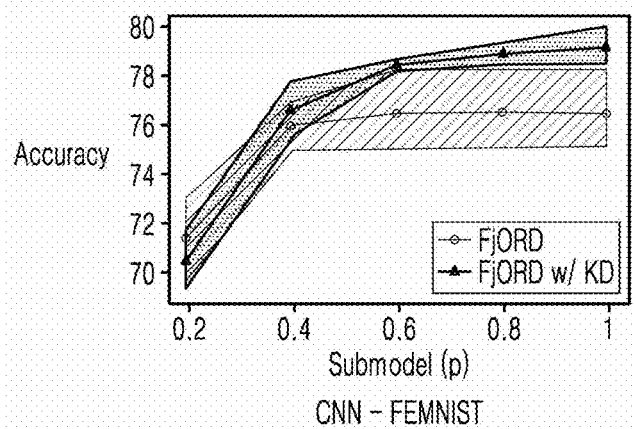
FIG. 7B shows results from ablation experiments performed using federated learning using ordered dropout according to an exemplary embodiment of the present disclosure.
Figure 7C:
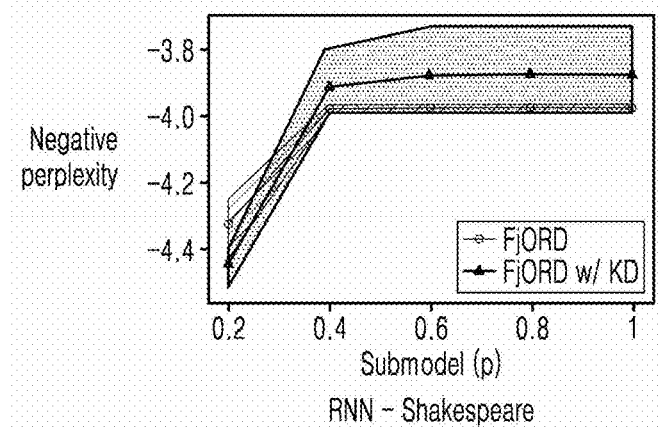
FIG. 7C shows results from ablation experiments performed using federated learning using ordered dropout according to an exemplary embodiment of the present disclosure.

FIGS. 7A, 7B and 7C show the efficacy of FjORD with Knowledge distillation (KD) in federated learning settings according to an exemplary embodiment of the present disclosure. FjORD's KD consistently improves the performance across all three datasets when p>0.4, with average gains of 0.18; 0.68 and 0.87 pp for submodels of size 0.6; 0.8 and 1 on CIFAR-10, 1.96, 2.39 and 2.65 pp for FEMNIST and 0.10 pp for Shakespeare. For the cases of p 0.4, the impact of KD is fading, possibly due to optimising for the average accuracy across submodels. It can be readily seen however that KD significantly improves the performance of the global model, yielding gains of 0.71 and 2.63 pp for CIFAR10 and FEMNIST and 0.10 p for Shakespeare.

An important characteristic of the present techniques is the ability for the training technique to scale to a larger number of device clusters or, equivalently, perform well with higher granularity of p values. To illustrate this, the performance of OD is tested across two setups, uniform-5 and uniform-10.

Figure 8A:
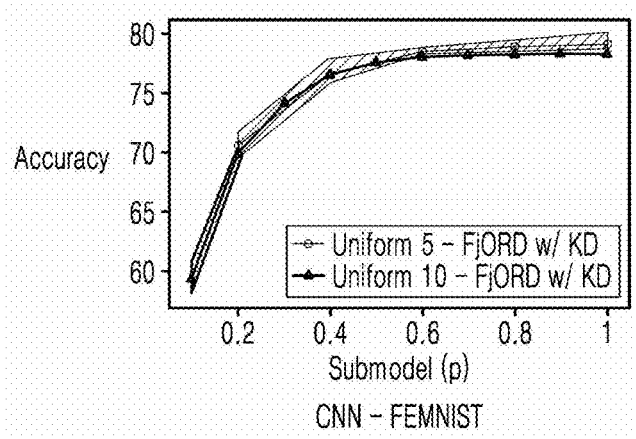
FIG. 8A shows results from experiments to test scalability of the present techniques according to an exemplary embodiment of the present disclosure.
Figure 8B:
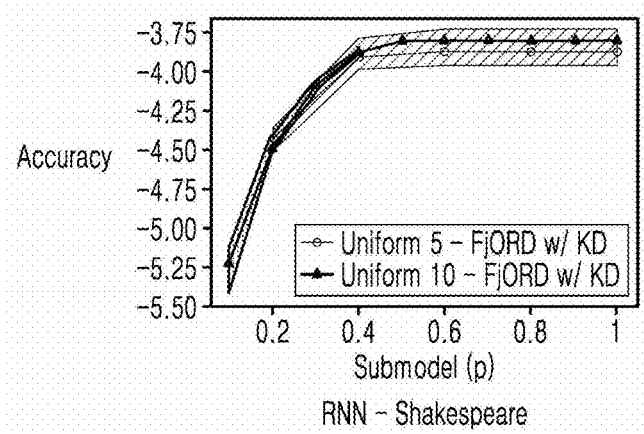
FIG. 8B shows results from experiments to test scalability of the present techniques according to an exemplary embodiment of the present disclosure.

FIGS. 8A and 8B show the ability of ordered dropout to scale to larger number of device clusters; put another way, to perform well with higher granularity p values. FIGS. 8A and 8B compare setups with uniform-5 and uniform-10 distributions; i.e. $p \sim U_5$ and $p \sim U_{10}$. As can be seen, ordered dropout (FjORD) sustains performance even under the higher granularity of p values. Thus for applications where the modelling of clients' needs to be more fine-grained, ordered dropout can still be of great value, without any significant degradation in achieved accuracy per submodel. This further supports the use-case where device-load needs to be modelled explicitly in device clusters (e.g. modelling device capabilities and load with deciles).

Figure 9A:
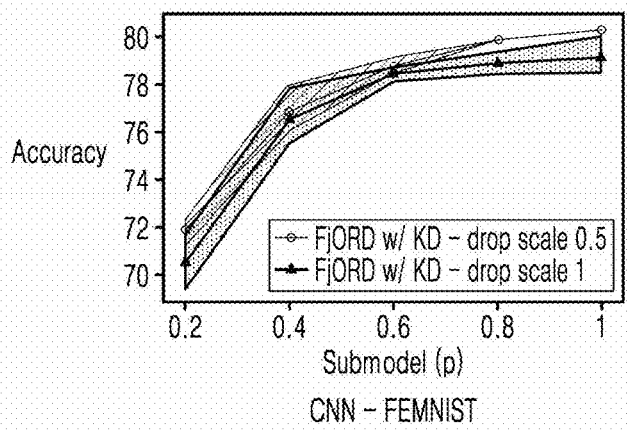
FIG. 9A shows results from experiments to test adaptability of the present techniques according to an exemplary embodiment of the present disclosure.
Figure 9B:
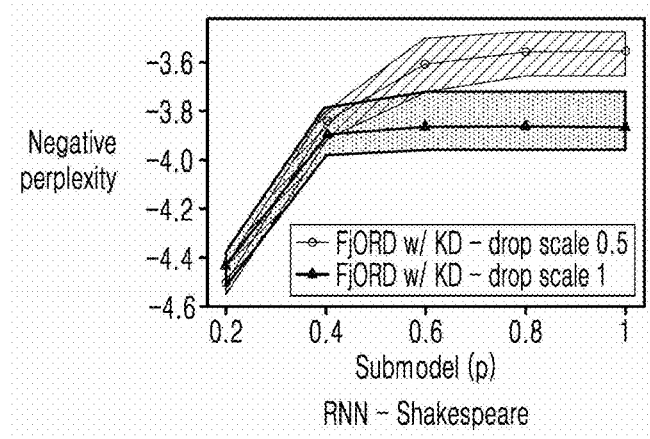
FIG. 9B shows results from experiments to test adaptability of the present techniques according to an exemplary embodiment of the present disclosure.

FIGS. 9A and 9B show the elasticity of ordered dropout with respect to the allocation of devices in each cluster according to an exemplary embodiment of the present disclosure. Here a uniform-5 setup is applied in combination with a drop scale $ds \in \{0.5, 1.0\}$, which is a parameter effecting a possible skew in number of devices per cluster. In this way a high end cluster n contains $1 - \Sigma_{i=1}^{n-1} ds/n$ of the devices such that for ds=1.0 all devices can run the p=0.2 network, 80% can run the p=0.4 network, and so on; i.e. leading to a device distribution of (0.2, . . . , 0.2). The percentage drop is half for ds=0.5, resulting in a larger high end cluster; e.g. (0.1, 0.1, . . . , 0.6). In other words, in both cases clients can support models of $p^i_{max} \in \{0.2, \ldots, 0.8\}$, but in the ds=0.5 case the highest cluster accounts for 60% of the devices. This reflects the case where the majority of the participating devices are able to run the whole original model.

The results of FIGS. 9A and 9B show that the larger submodels are expectedly more accurate, being updated more often. However, the same graphs also indicate that FjORD does not significantly degrade the accuracy of the smaller submodels in the presence of more high-tier devices (i.e. ds=0:5). This is a direct consequence of sampling p values during local rounds, instead of tying each tier with only the maximal submodel it can handle. It should also be noted that the uniform sampling has not been altered on the premise that high-end devices are seen more often, precisely to illustrate the adaptability of ordered dropout to latent user device distribution changes of which the server may not be aware.

Figure 10:
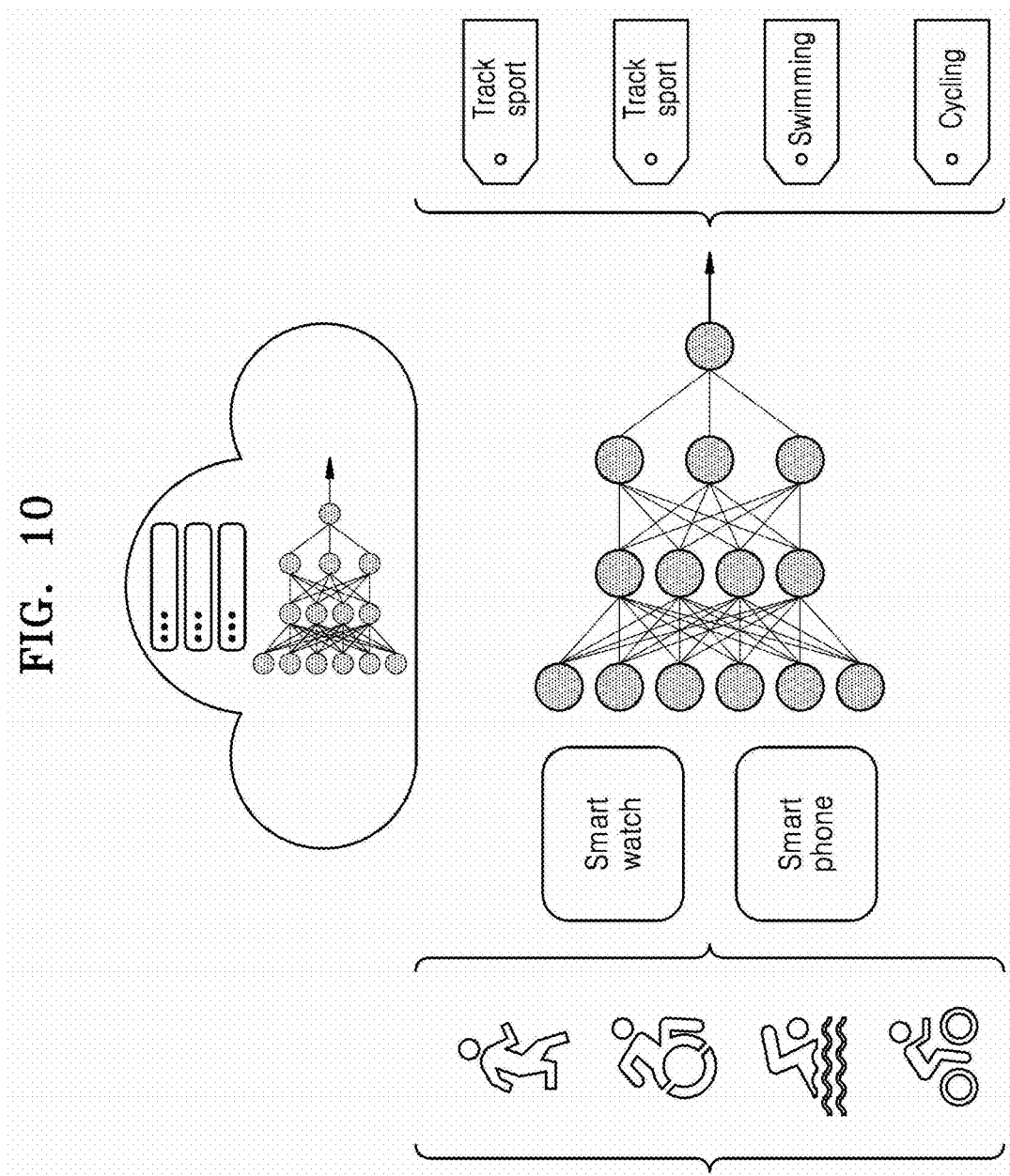
FIG. 10 shows an example use of the present techniques for training a ML model according to an exemplary embodiment of the present disclosure.

Example embodiments. FIG. 10 shows an example use of the present techniques for training a ML model according to an exemplary embodiment of the present disclosure. The present techniques may enable activity recognition and medical health applications, such as sleep tracking, without the provider of the ML model accessing specific sensor data that may be gathered from wearables (e.g. smartwatch or fitness tracker) or smartphones. The present techniques advantageously mean no user-specific data needs to be sent to the provider of the ML model or owner of any app that uses the ML model. Local training is completed on-device and, as explained above, gradients are aggregated across clients to update the global model.

Figure 11:
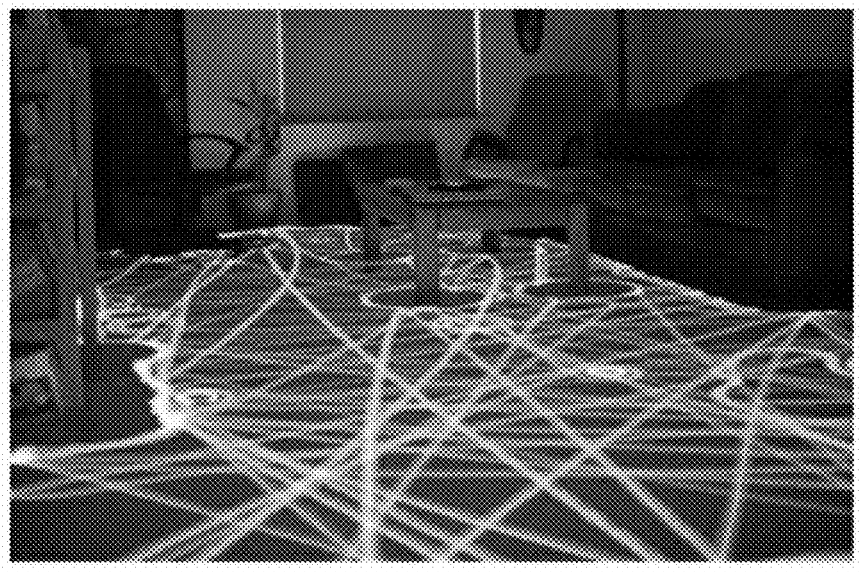
FIG. 11 shows another example use of the present techniques for training a ML model according to an exemplary embodiment of the present disclosure.

FIG. 11 shows another example use of the present techniques for training a ML model according to an exemplary embodiment of the present disclosure. The present techniques may enable tasks involving environment recognition, such as Augmented Reality (AR) and robotic assistants. AR devices may track and interact with multiple rooms, wherever used or worn by a user. Robotic assistants and robotic vacuum cleaners may move around rooms and interact with their environment. FIG. 11 shows a robotic vacuum cleaner trajectory light trail, illustrating the extent of interaction and movement of the device in a room. However, due to their semi-mobile nature, these devices typically have limited computing capabilities which cannot be increased. For example, in the case of an AR device, additional computing resources would increase the weight of the device making it cumbersome to wear and use. Similarly, battery life is robotic devices is important, and therefore increasing the computing resources to implement or train ML models would decrease the battery life. Furthermore, as these devices interact with a user's home and surroundings, it is important that any data obtained by these devices is kept private.

Another example use of the present techniques is to improve handwriting recognition. Many Samsung products come with S Pen equipped. The present techniques can be used to boost handwriting recognition without directly accessing a user's data (e.g. what they have written using the S Pen) and with a smaller training overhead. This can, in turn, be used to achieve better handwriting recognition global models, which can be implemented on multiple devices. The global models could be personalised further using meta-learning techniques that enable them to perform better on a specific user's handwriting.

FIG. 12 is an example system 100 for training a ML model using federated learning according to an exemplary embodiment of the present disclosure. The system 100 comprises a server 102, and a plurality of client devices or apparatuses 110. For the sake of simplicity, a single apparatus 110 is shown here.

The server 102 comprises at least one processor 104 coupled to memory 106. The at least one processor 104 may comprise one or more of: a microprocessor, a microcontroller, and an integrated circuit. The memory 106 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example.

The server 102 stores a global ML model 108, which is to be trained using federated learning and the plurality of apparatus 110.

The at least one processor 104 coupled to memory 106 may be arranged to: determining a capability of each client device 110; associating each client device with a value defining how much of each neural network layer of the ML model 108 is to be included in a target submodel implemented by the client device 110, based on the determined capability; generating a plurality of nested submodels 109 of the ML model 108 by using the value associated with each client device to perform ordered pruning of at least one neural network layer of the ML model; and distributing, during each federated learning training round, a submodel 109 of the ML model to each client device based on the value associated with each client device.

The apparatus 110 may be any one of: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, a smart consumer device, a smartwatch, a fitness tracker, and a wearable device. It will be understood that this is a non-exhaustive and non-limiting list of example apparatus.

Each client device or apparatus 110 may comprise at least one processor 112 coupled to memory 114. The at least one processor 112 may comprise one or more of: a microprocessor, a microcontroller, and an integrated circuit. The memory 114 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example.

Each apparatus 110 receives a (nested) submodel 109 for training locally, from the server 102, based on the hardware capabilities of the apparatus (i.e. the memory capacity of memory 114 and processing capability of processor(s) 112). The apparatus comprises storage 120 for storing private training data 122 collected or obtained by the apparatus 110. The private training data 122 may be health data (e.g. heartrate, step count, etc.), images or videos, hand-written documents, and so on. At training time, the processor 112 may be arranged to: determine a current computation capability of the apparatus 110; and extract, from the received submodel, a smaller nested submodel for training using the stored private training data. That is, if the computation capability of the apparatus 110 is currently being used to perform one or more other tasks (e.g. capturing images, participating in a call, etc.), then fewer resources are available for training the submodel. In this case, since the received submodel 109 is sent to the apparatus 110 based on its maximum computation capability, the apparatus 110 may only be able to train a submodel of the received submodel at this particular time.

The apparatus 110 may further comprising at least one image capture device 116 for capturing images or videos to be used as the private training data. Additionally or alternative, the apparatus may further comprise at least one interface 118 for collecting data which forms the private training data. For example, the interface 118 may be a communication interface for receiving (via a wired or wireless connection) data collected by another device. For example, the apparatus 110 may be a smartphone which receives, via interface 118, heartrate data from a wearable fitness tracker.

FIG. 13 is a flowchart of example steps performed by an apparatus to train a ML model using federated learning according to an exemplary embodiment of the present disclosure. The storage 120 stores private training data collected by the apparatus 110 which is used to locally train the ML model. The at least one processor 112 coupled to memory 114 may be arranged to: receive, from a server 102, a submodel 109 of the ML model 108 generated based on a capability on the apparatus (step S200). Optionally, as explained above, the processor 112 may be arranged to: determine a current computation capability of the apparatus 110; and extract, from the received submodel, a smaller nested submodel (step S202) for training using the stored private training data. The processor 112 may train the submodel (i.e. the full received submodel, or one of the nested submodels therein) using the stored private training data 122 and updating weights of the submodel (step S204); and transmit, to the server 102, gradients of a maximally updated submodel, where each gradient corresponds to changes in weights of the submodel 109 (step S206).

In summary, the present techniques provide a federated learning method for heterogeneous device training. To this direction, FjORD builds on top of the Ordered Dropout technique as a means to extract submodels of smaller footprints from a main model in a way where training the part also participates in training the whole. It is shown that the Ordered Dropout has a performance in the local and federated setting that exceeds that of competing techniques, while maintaining flexibility across different environment setups. Advantageously, the present techniques enable more types of client devices to participate in federated learning, and any potential downside to training using customised submodels is compensated by enabling more client devices and more varied training data to participate in the training process. In typical federated learning processes, any client devices that do not provide their locally trained models to the server within a baseline time period (e.g. 30 seconds) are often automatically excluded from the training process. In contrast, in the present techniques, the use of the customised submodels means that all devices will be able to send the results of their local training back to the server within the baseline time period.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. A method performed by a central computing device for training a machine learning (ML) model comprising a neural network using federated learning performed by a plurality of client devices, the method comprising:
determining a computation capability of each client device of the plurality of client devices;
associating the each client device with a dropout rate defining how much of each neural network layer of the ML model is to be included in a target submodel to be trained by the each client device, based on the determined computation capability;
generating different sized submodels of the ML model that are nested within the ML model such a largest submodel of the different sized submodels is included in the ML model and each of an increasingly smaller in size submodel of the different sized submodels is included in a next larger in size submodel of the different sized submodels, the different sized submodels being generated by using the dropout rate associated with the each client device to perform pruning of at least one neuron of at least one neural network layer of the ML model according to a predefined ordering such that the at least one neuron that is pruned is not used by any submodel of the different sized submodels for which the at least one neuron is pruned; and
distributing, during each federated learning training round, at least two submodels of the different sized submodels to at least one client device of the plurality of client devices based on the dropout rate associated with the at least one client device, the at least two submodels including, a submodel and at least one submodel nested within the submodel, from among the different sized submodels,
wherein the generating of the different sized submodels of the ML model that are nested within the ML model comprises:
using the dropout rate associated with the each client device to perform the ordered pruning of one neural network layer of the ML model; and
using at least one further dropout rate to perform the pruning of at least one further neural network layer of the ML model.

2. The method as claimed in claim 1, wherein the associating of the each client device with the dropout rate comprises associating the each client device with the dropout rate from a distribution of discrete dropout rates.

3. The method as claimed in claim 2, wherein the distribution of the discrete dropout rates is a uniform distribution.

4. The method as claimed in claim 2, wherein the distribution of the discrete dropout rates is a non-uniform distribution which reflects a distribution of capabilities of the plurality of client devices.

5. The method as claimed in claim 2, wherein a number of the discrete dropout rates in the distribution of the discrete dropout rates depends on at least one of:
a number of device computation capability levels;
a size or width of neural network layers; or
a number of the device computation capability levels included in the ML model.

6. The method as claimed in claim 1, wherein the generating of the different sized submodels of the ML model that are nested within the ML model comprises using the dropout rate associated with the each client device to perform ordered pruning of the each neural network layer of the ML model.

7. The method as claimed in claim 1, wherein the distributing, during the each federated learning training round, of the at least two submodels to the at least one client device comprises broadcasting the submodel, which is generated using the dropout rate, to the at least one client device associated with the dropout rate, for local training by the at least one client device.

8. The method as claimed in claim 1, further comprising:
receiving, during the each federated learning training round, gradients of a supported updated submodel from the at least one client device, where each gradient corresponds to changes in weights of the submodel.

9. The method as claimed in claim 8, further comprising:
aggregating, using the received gradients, the changes in weights of the submodel received from at least the at least one client device; and
updating the ML model.

10. The method as claimed in claim 9, further comprising:
repeating, the generating of the different sized submodels of the ML model that are nested within the ML model and the distributing of the at least two submodels to the at least one client device, using the updated ML model.

11. The method as claimed in claim 1, wherein the ordering is predefined based on importance of the at least one neuron.

12. One or more non-transitory computer-readable storage media storing instructions that, when individually or collectively executed by at least one processor of a central computing device for training a machine learning (ML) model comprising a neural network using federated learning performed by a plurality of client devices, cause the central computing device to perform operations, the operations comprising:
   determining a computation capability of each client device of the plurality of client devices;
   associating the each client device with a dropout rate defining how much of each neural network layer of the ML model is to be included in a target submodel to be trained by the each client device, based on the determined computation capability;
   generating different sized submodels of the ML model that are nested within the ML model such a largest submodel of the different sized submodels is included in the ML model and each of an increasingly smaller in size submodel of the different sized submodels is included in a next larger in size submodel of the different sized submodels, the different sized submodels being generated by using the dropout rate associated with the each client device to perform pruning of at least one neuron of at least one neural network layer of the ML model according to a predefined ordering such that the at least one neuron that is pruned is not used by any submodel of the different sized submodels for which the at least one neuron is pruned; and
   distributing, during each federated learning training round, at least two submodels of the different sized submodels to at least one client device of the plurality of client devices based on the dropout rate associated with the at least one client device, the at least two submodels including, a submodel and at least one submodel nested within the submodel, from among the different sized submodels,
   wherein the generating of the different sized submodels of the ML model that are nested within the ML model comprises:
      using the dropout rate associated with the each client device to perform the ordered pruning of one neural network layer of the ML model; and
      using at least one further dropout rate to perform the pruning of at least one further neural network layer of the ML model.

13. The one or more non-transitory computer-readable storage media of claim 12, wherein the ordering is predefined based on importance of the at least one neuron.

14. A system for training a machine learning (ML) model comprising a neural network using federated learning performed by a plurality of client devices, the system comprising:
   the plurality of client devices; and
   a central computing device comprising:
      memory storing instructions, and
      at least one processor communicatively coupled to the memory,
      wherein the instructions, when executed by the at least one processor individually or collectively, cause the central computing device to:
         determine a capability of each client device of the plurality of client devices,
         associate the each client device with a dropout rate defining how much of each neural network layer of the ML model is to be included in a target submodel implemented by the each client device, based on the determined computation capability,
         generate a different sized submodels of the ML model that are nested within the ML model such a largest submodel of the different sized submodels is included in the ML model and each of an increasingly smaller in size submodel of the different sized submodels is included in a next larger in size submodel of the different sized submodels, the different sized submodels being generated by using the dropout rate associated with the each client device to perform pruning of at least one neuron of at least one neural network layer of the ML model according to a predefined ordering such that the at least one neuron that is pruned is not used by any submodel of the different sized submodels for which the at least one neuron is pruned, and
         distribute, during each federated learning training round, at least two submodels of the different sized submodels to at least one client device of the plurality of client devices based on the dropout rate associated with the at least one client device, the at least two submodels including, a submodel and at least one submodel nested within the submodel, from among the different sized submodels, and
      wherein to generate the different sized submodels of the ML model that are nested within the ML model, the instructions, when executed by the at least one processor individually or collectively, further cause the central computing device to:
         use the dropout rate associated with the each client device to perform the ordered pruning of one neural network layer of the ML model; and
         use at least one further dropout rate to perform the pruning of at least one further neural network layer of the ML model.

15. The system as claimed in claim 14, wherein the instructions, when executed by the at least one processor individually or collectively, further cause the central computing device to:
   associate the each client device with the dropout rate from a distribution of discrete dropout rates.

16. The system as claimed in claim 15, wherein the distribution of the discrete dropout rates is a uniform distribution.

17. The system as claimed in claim 15, wherein the distribution of the discrete dropout rates is a non-uniform distribution which reflects a distribution of capabilities of the plurality of client devices.

18. The system as claimed in claim 15, wherein a number of the discrete dropout rates in the distribution of the discrete dropout rates depends on at least one of:
   a number of device computation capability levels,
   a size or width of neural network layers, or
   a number of the device computation capability levels included in the ML model.

19. The system as claimed in claim 14, wherein the ordering is predefined based on importance of the at least one neuron.

* * * * *